Patented Aug. 5, 1930

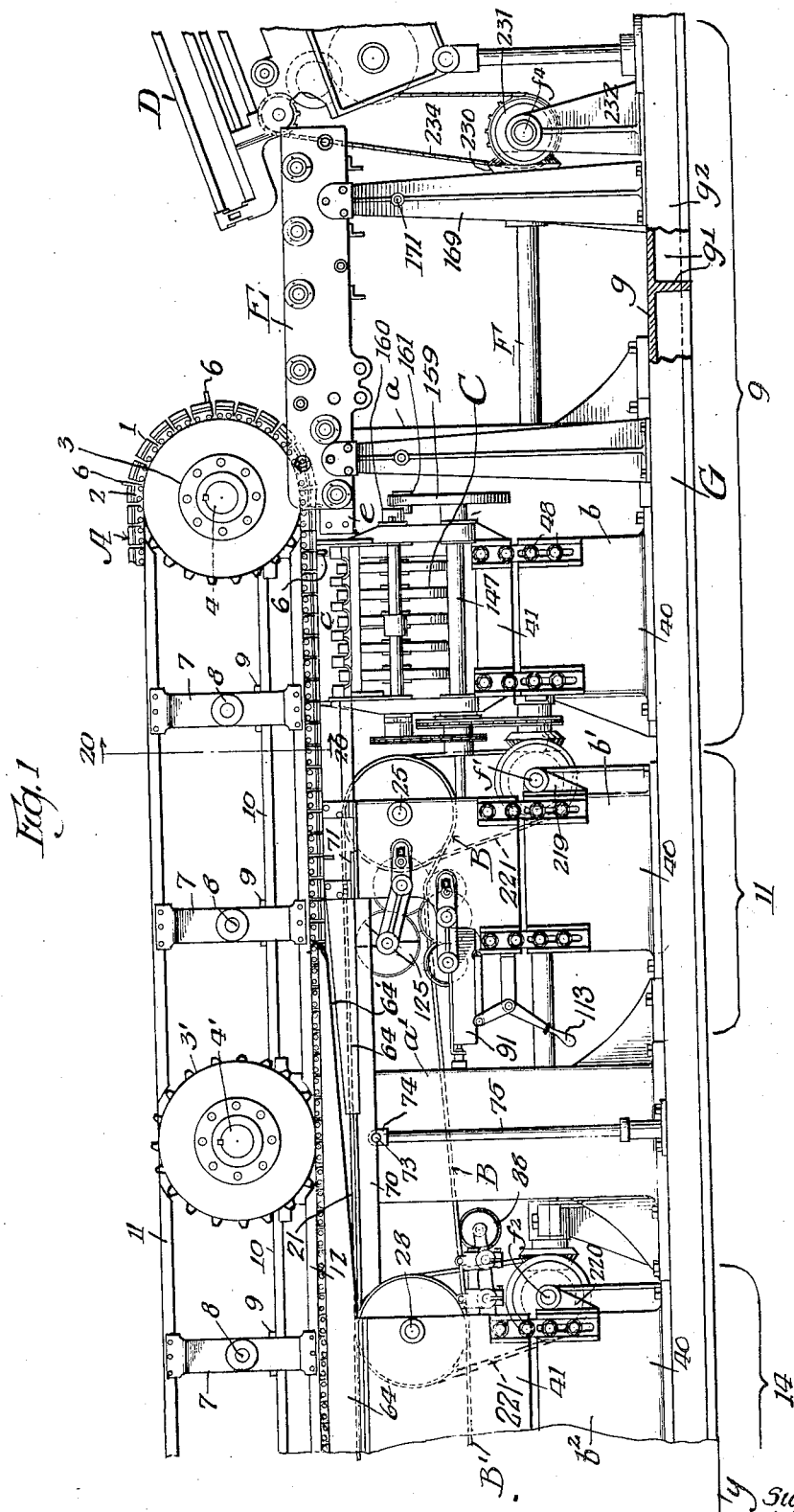

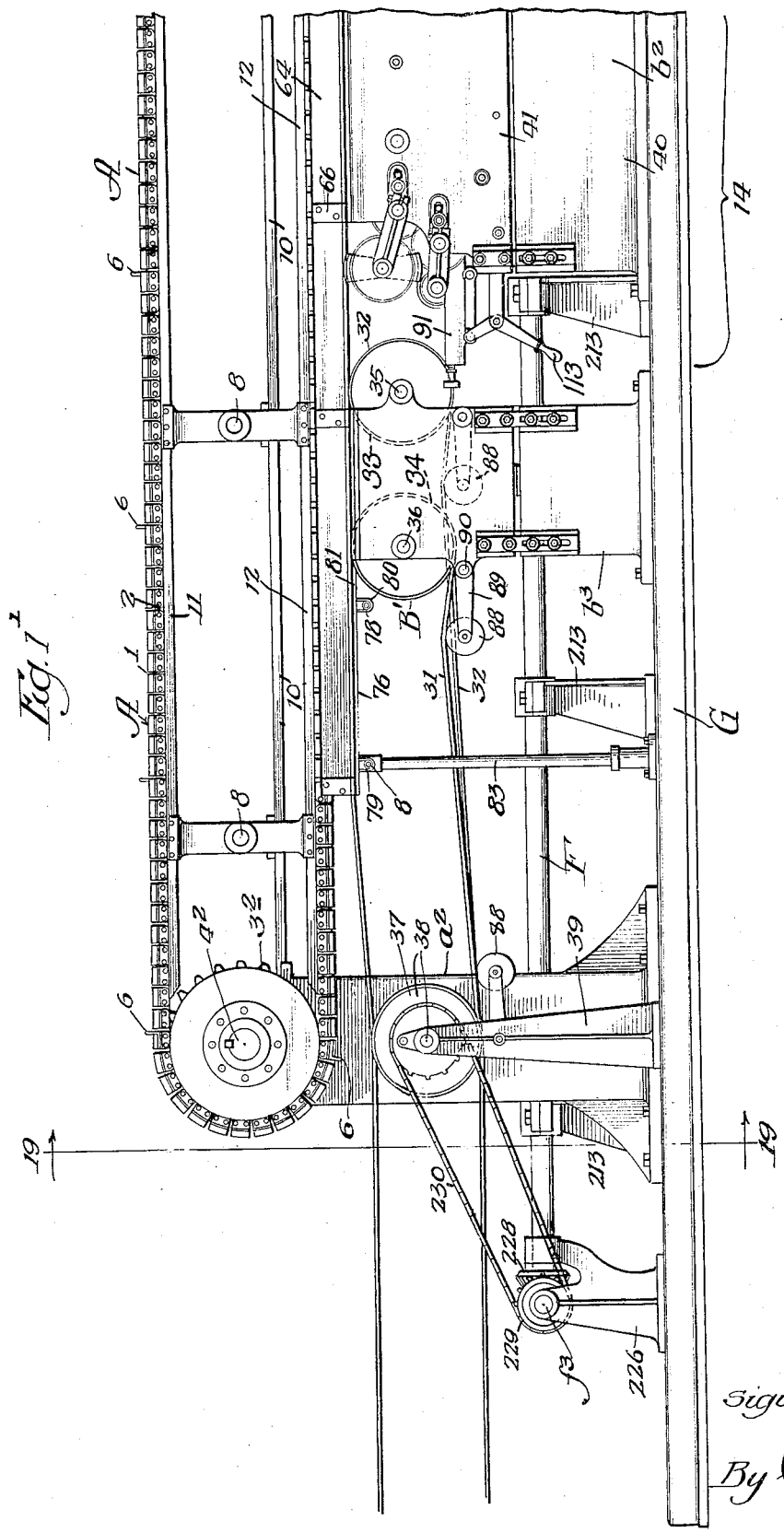

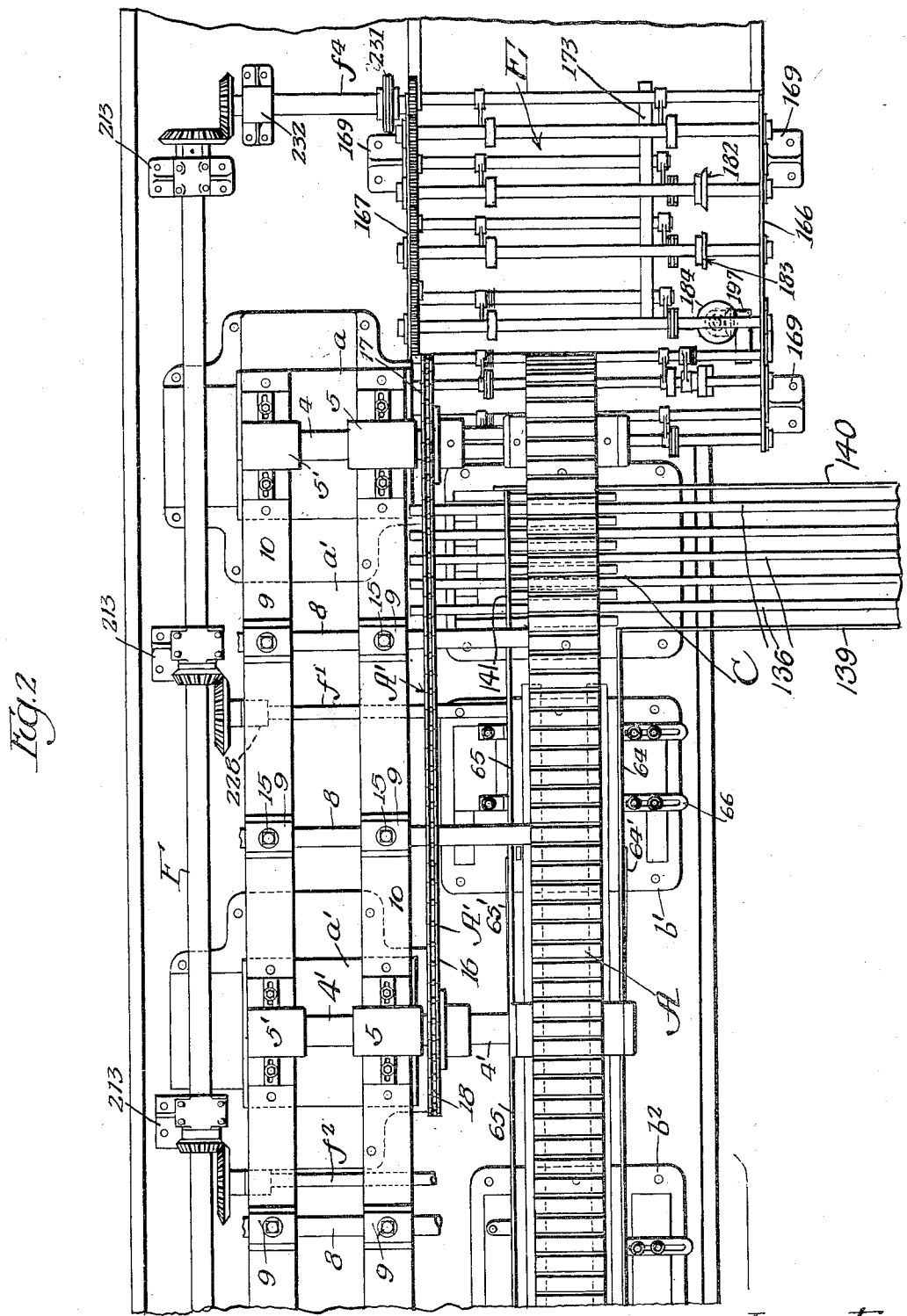

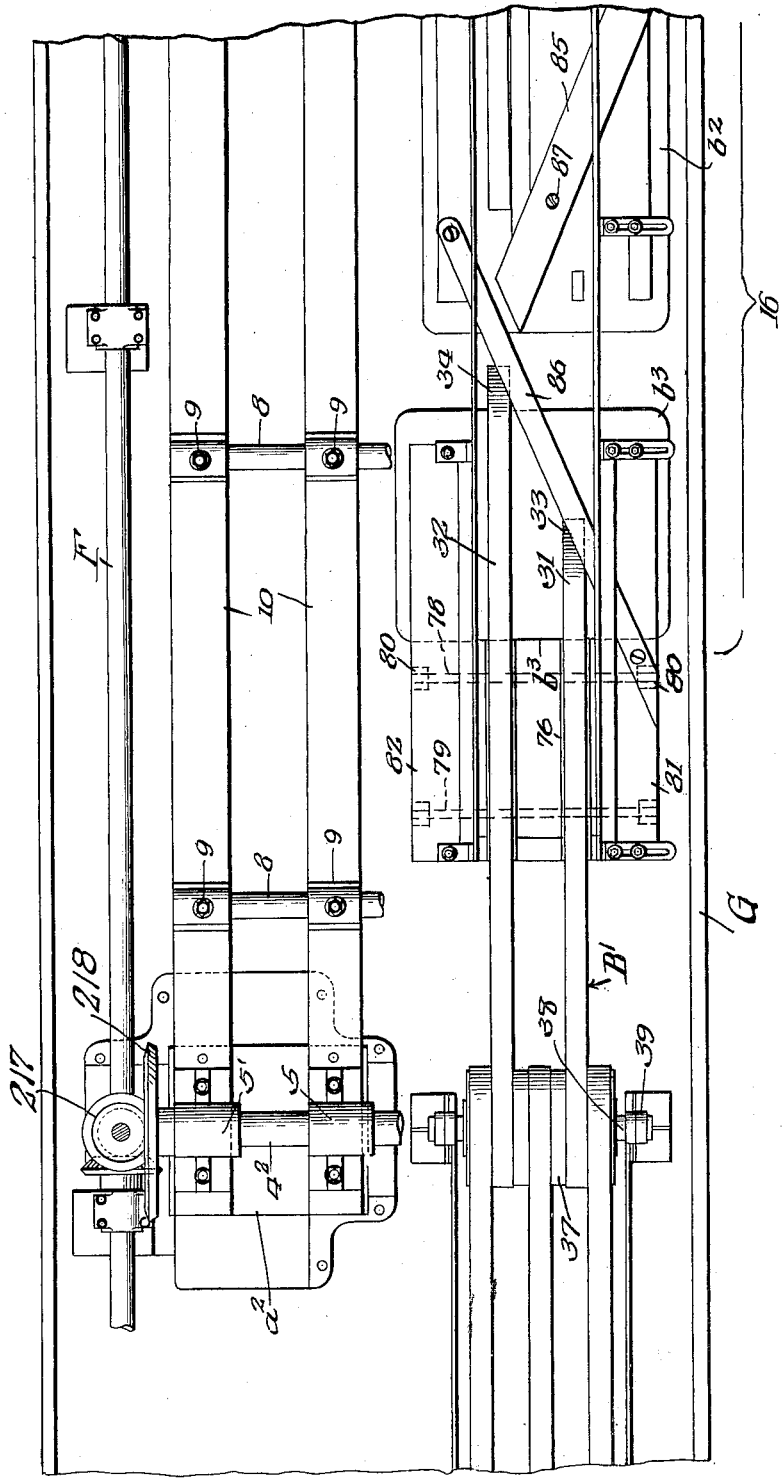

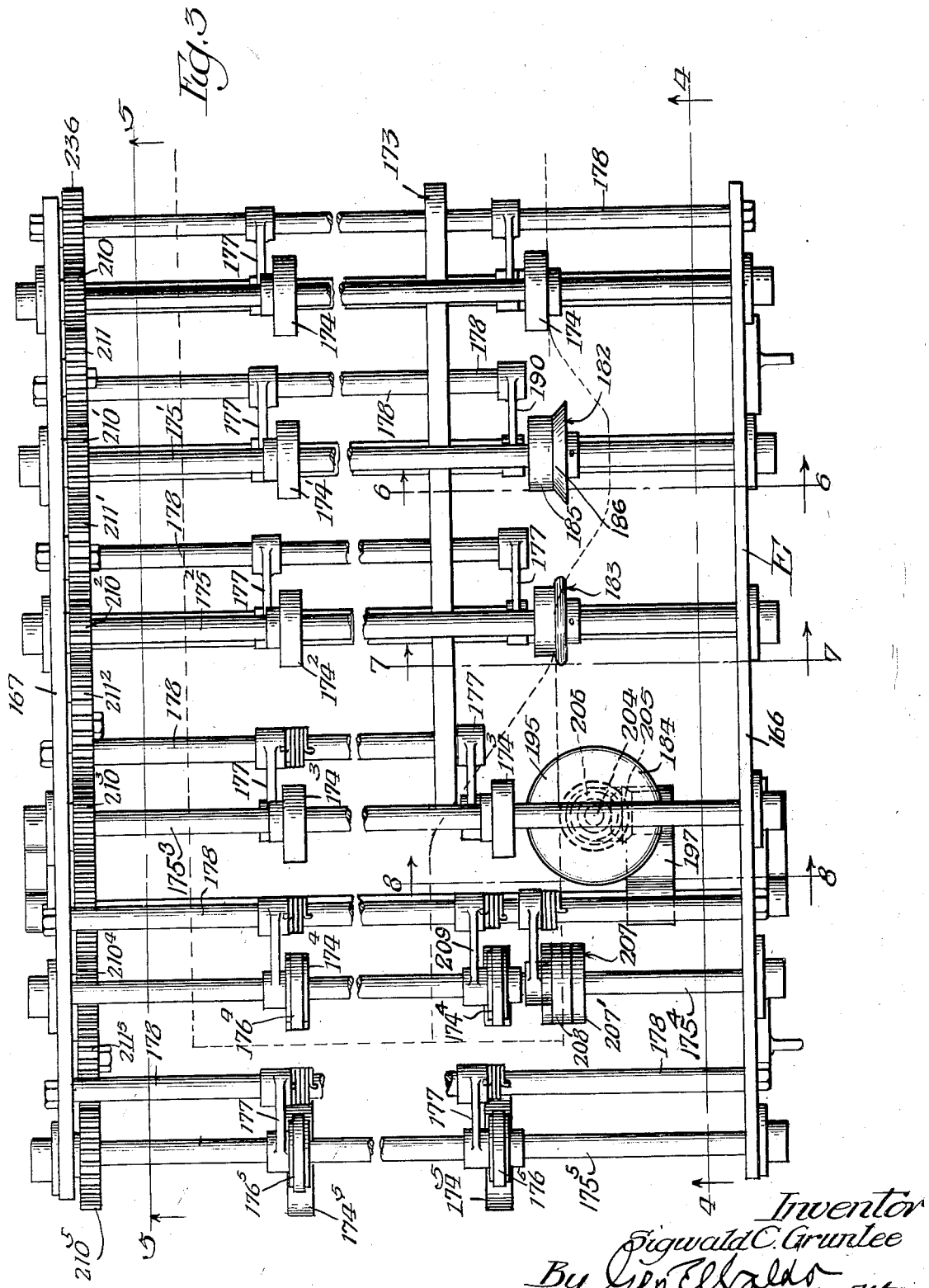

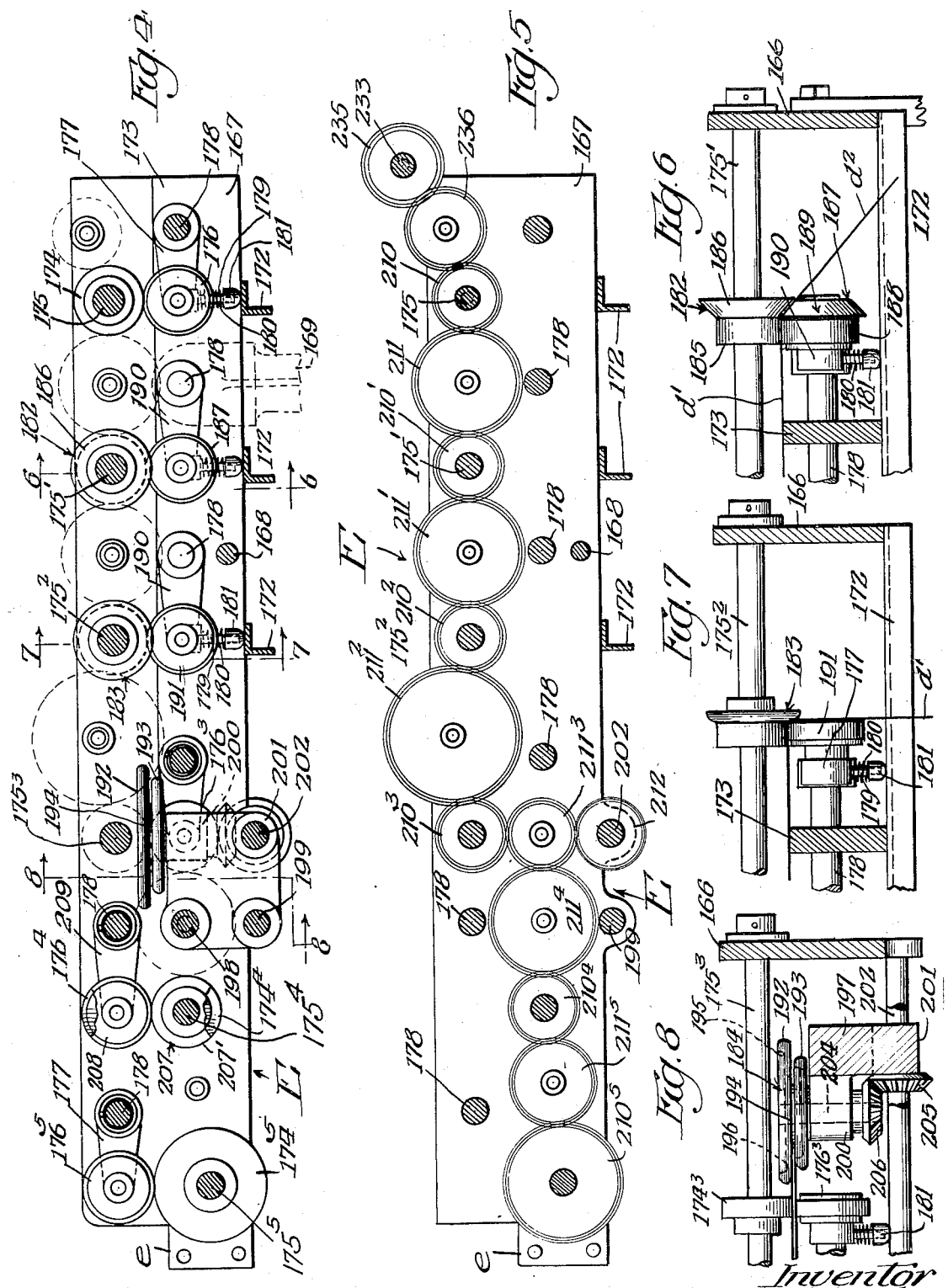

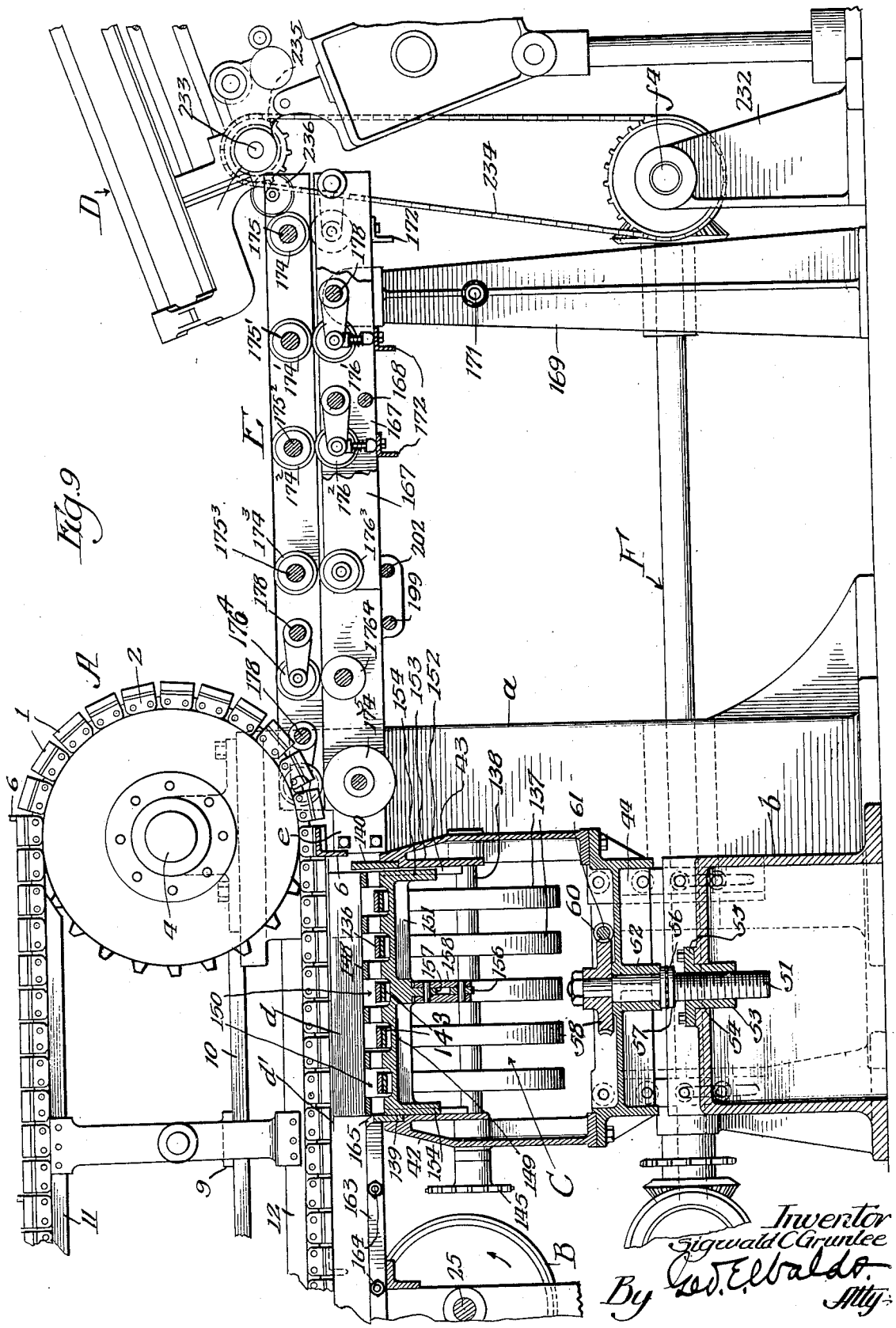

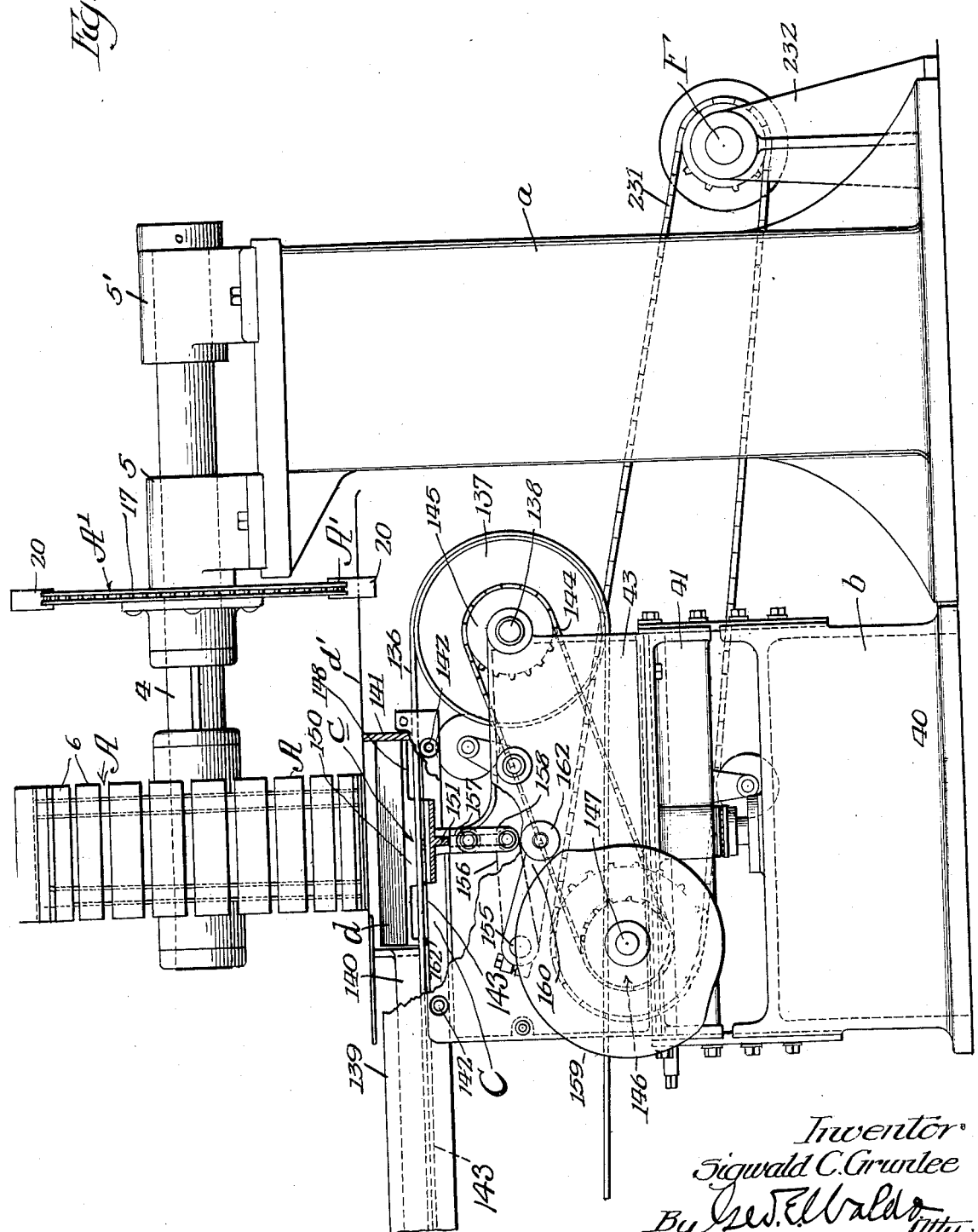

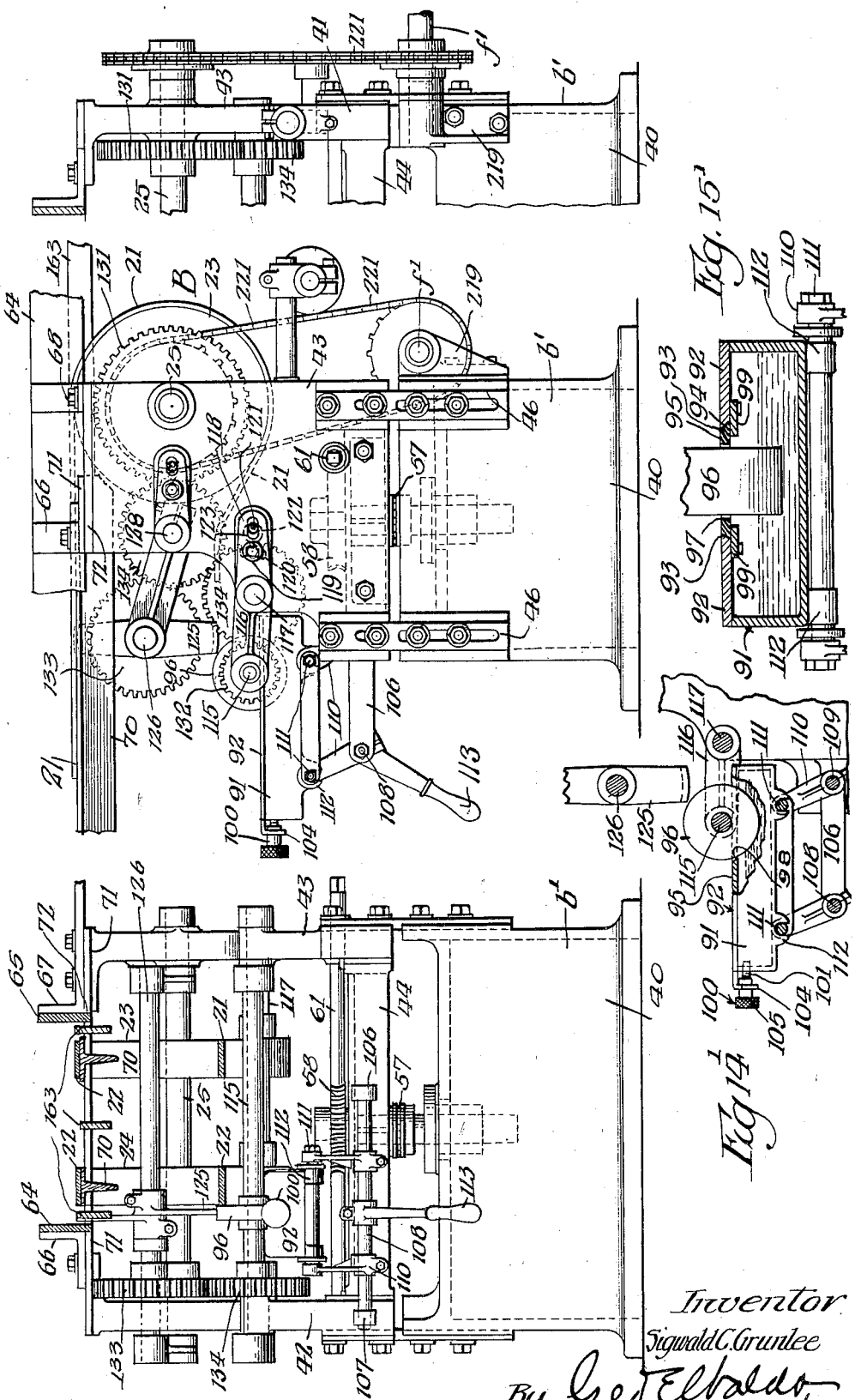

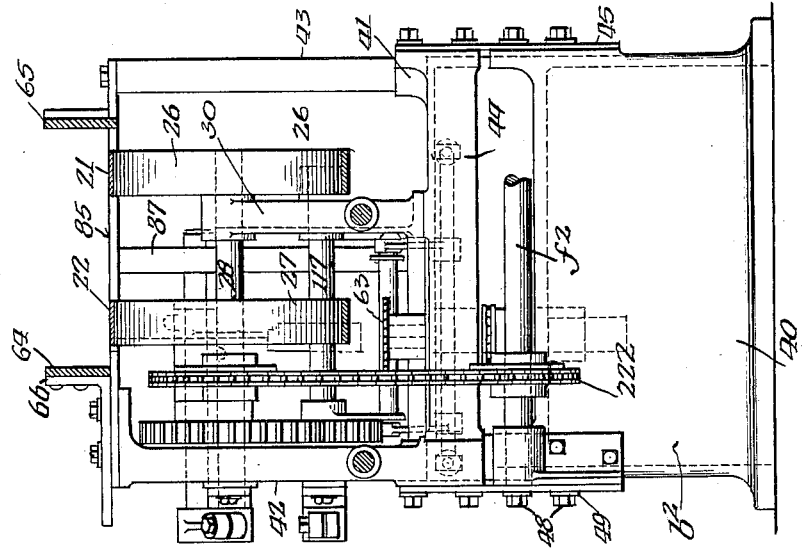

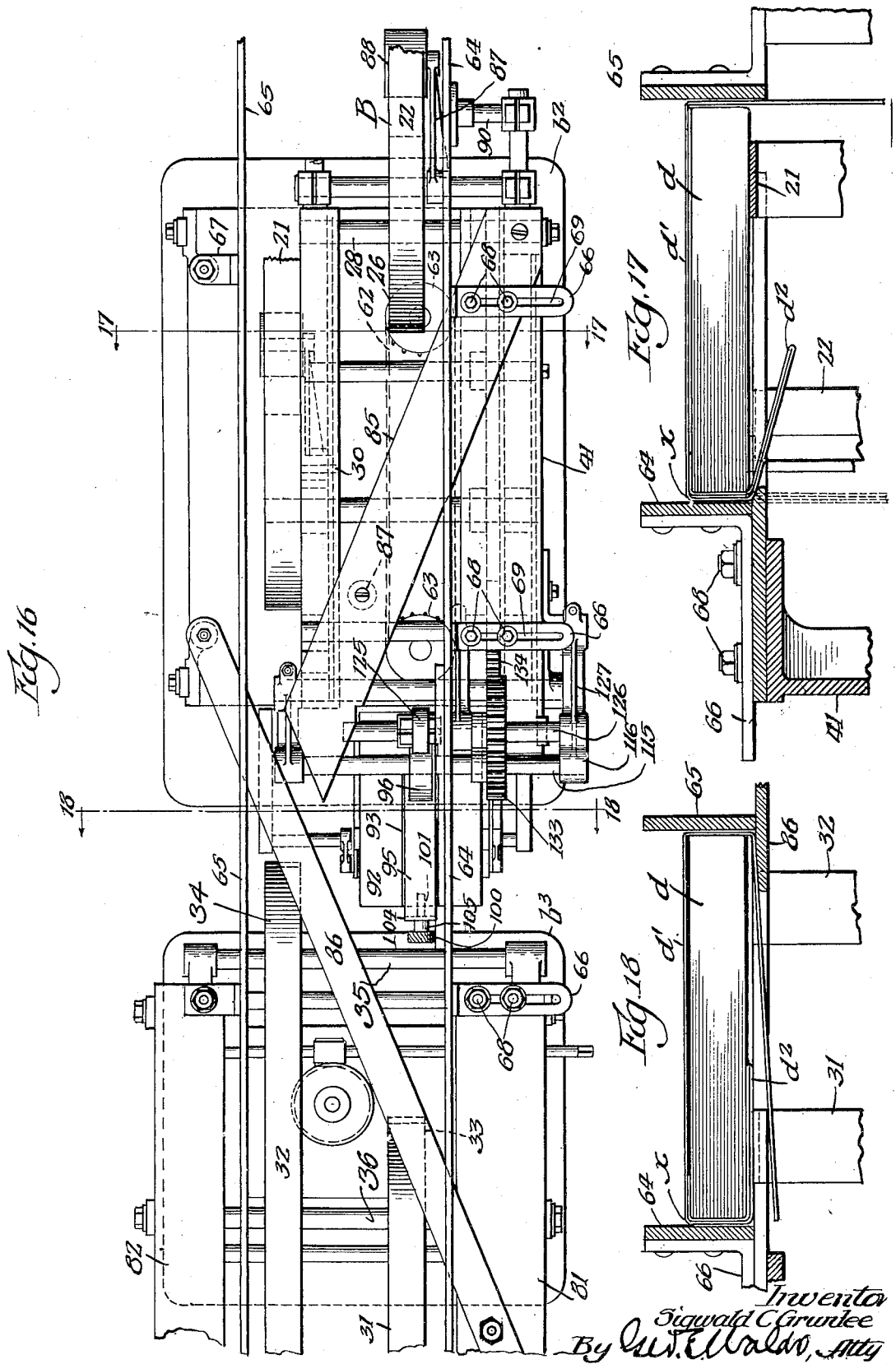

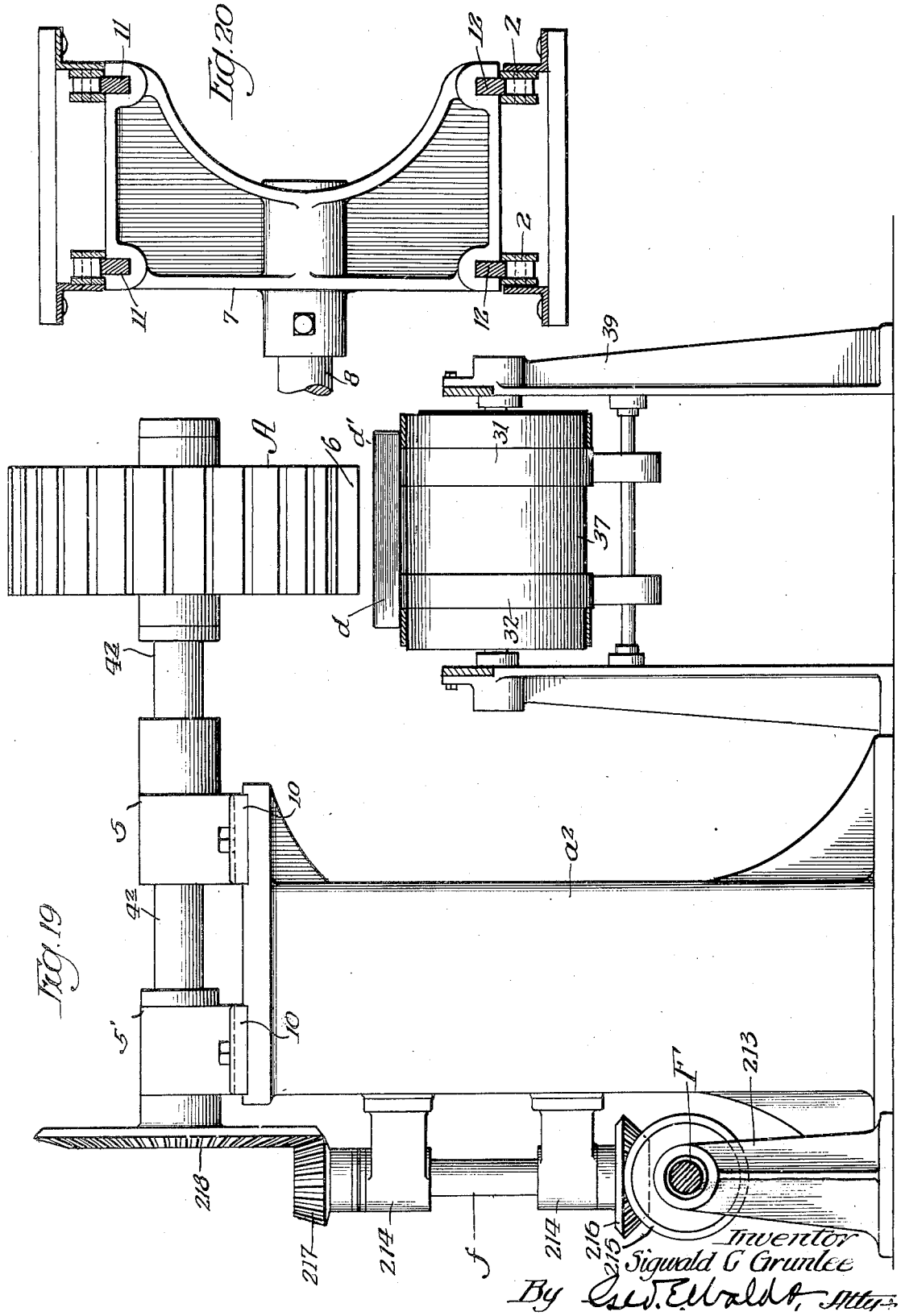

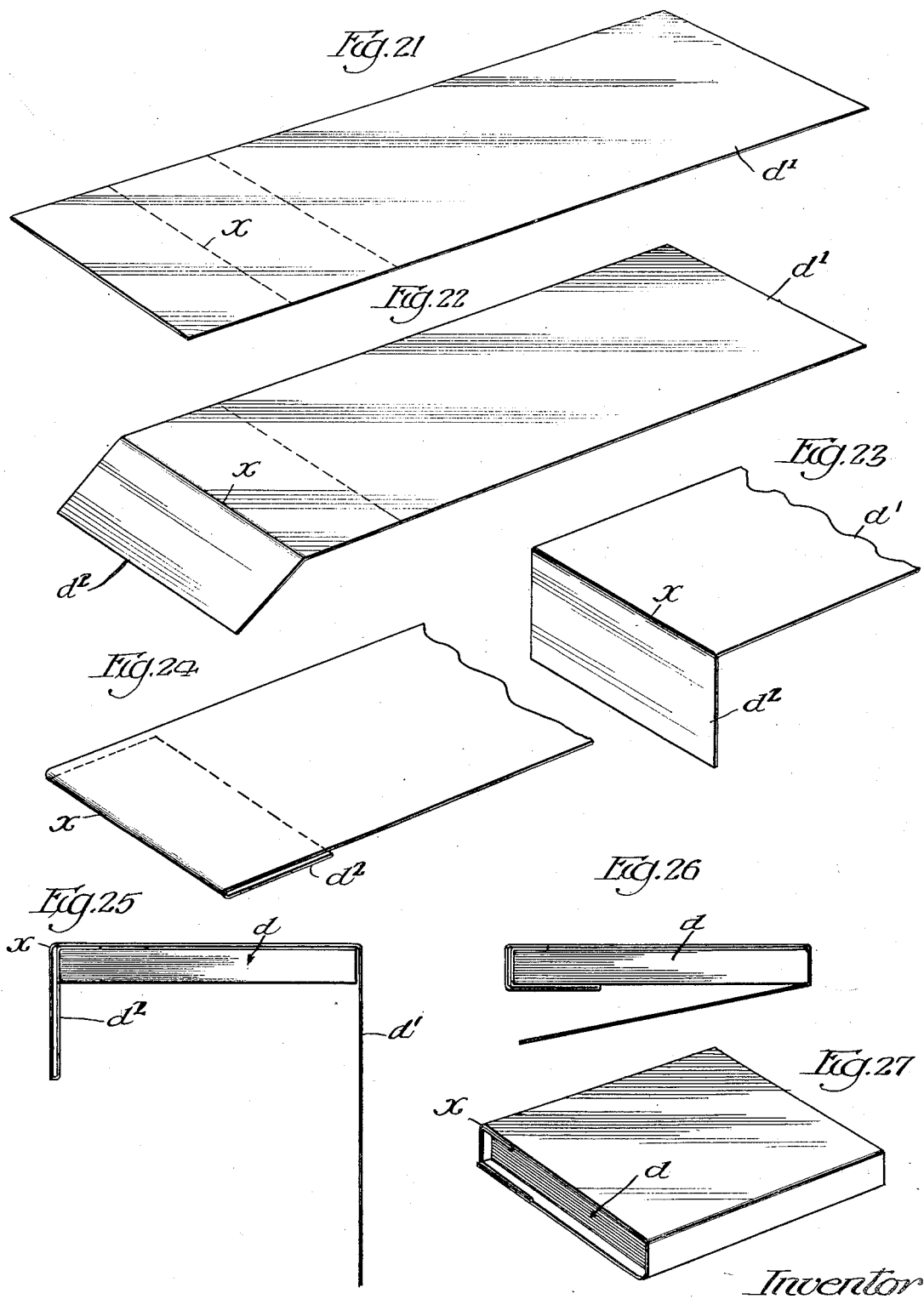

1,772,143

UNITED STATES PATENT OFFICE

SIGWALD C. GRUNLEE, OF CHICAGO, ILLINOIS, ASSIGNOR TO W. F. HALL PRINTING COMPANY, OF CHICAGO, ILLINOIS, A CORPORATION OF ILLINOIS

WRAPPING MACHINE

Application filed February 13, 1928. Serial No. 254,076.

This invention relates to wrapping machines particularly designed and adapted for wrapping catalogues, magazines and the like.

Objects of the invention are to provide a wrapping machine which will be simple in construction, strong and durable; which will be effective in operation and will have large capacity; and which may conveniently be adjusted to provide for wrapping articles, as books, catalogs, magazines and the like, of different lengths, widths, and thickness.

To effect the objects thereof a machine embodying my invention and improvements comprises the various features, combinations of features and details of construction hereinafter described and claimed.

In the accompanying drawings, in which my invention is fully illustrated,—

Figures 1, 1' are side elevations of my improved machine.

Figures 2, 2' are top plan views thereof, the top conveyor of the machine being removed in the section 2' of said figures.

Figure 3 is an enlarged top plan view of combined creasing and feeding mechanism for delivering the wrappers to the machine.

Figures 4 and 5 are vertical sectional views thereof on the lines 4—4 and 5—5, respectively, of Figure. 3.

Figures 6, 7 and 8 are fragmentary detail views, partly in section, from the positions 6—6, 7—7, and 8—8, respectively, of Fig. 3.

Figure 9 is an enlarged side view, partly in section, of the front portion of the machine, indicated substantially by the brackets 9, Fig. 1, including the mechanisms for delivering the articles to be wrapped and the wrappers to the machine.

Figure 10 is an end view of the machine taken from the right hand side of Fig. 9 with the wrapper, feeding, creasing and delivering mechanism removed.

Figure 11 is an enlarged side view of the section of the machine indicated substantially by the brackets 11, Figs. 1, 1'.

Figure 12 is a view from the left side of Fig. 11.

Figure 13 is a fragmentary view from the right side of Fig. 11.

Figure 14 is an enlarged side view of the section of the machine indicated substantially by the bracket 14, Figs. 1, 1'.

Figure 15 is a view from the right side of Fig. 14.

Figures 14' and 15', are enlarged, fragmentary, detail views of the glue applying apparatus.

Figure 16 is an enlarged top plan view of the section of the machine indicated substantially by the brackets 16 in Figs. 2, 2' of the drawing, the top conveyor being removed.

Figures 17 and 18 are enlarged, fragmentary, detail sectional views on the lines 17—17 and 18—18, respectively, of Fig. 16, illustrating the manner of wrapping an article.

Figure 19 is an enlarged end view of the wrapping machine from the position 19—19 of Fig. 1'.

Figure 20 is an enlarged sectional view of the top conveyor and of the supporting brackets therefor taken substantially on the line 20—20 of Fig. 1; and Figures 21, 22, 23, 24, 25, 26 and 27 are diagrammatic views showing the manner of folding the wrapper and applying the same to an article to be wrapped, in practice.

Describing the invention generally, with particular reference to the drawings, my improved wrapping machine comprises, as essential elements, a top conveyor, designated as a whole A, and a support for the articles to be wrapped which comprises a bottom conveyor consisting of separate front and rear sections, designated, respectively, as a whole B, B'. In operation, the top laps of the conveyor sections B, B' are supported from sagging by means presently described. The conveyor A is mounted above the conveyor sections B, B', and the articles to be wrapped are delivered between the adjacent laps of said conveyors resting upon the upper laps of the bottom conveyor sections and being confined thereon and caused to move therewith by the top conveyor A, said top conveyor being supported in such position relative to the bottom conveyor that the bottom lap thereof will rest upon and its weight be borne by the articles being wrapped by the machine.

My improved wrapping machine is primarily designated and adapted for wrapping catalogues, designated $d$, of large mail order houses and the wrappers, designated $d'$, are preferably delivered to the wrapping machine by means of a suitable blank separating and feeding mechanism. However, where the wrappers are plain and flat, they may be fed to the machine by hand, as in the case of a printing press.

The covers of many books, particularly catalogues of large mail order houses, are made of considerably heavier and stronger paper than the leaves thereof and when the books are trimmed, the edges of the covers are usually quite sharp and experience has shown that, in handling and shipping, the sharp edges of the covers are liable to cut and sever the wrappers at the free edges of the books, the wrappers frequently becoming detached and the catalogues failing to reach the persons to whom they are addressed.

It has been found that severing and detachment of the wrappers can be prevented almost entirely by the use of wrappers which are folded to provide portions of double thickness which are adjusted around the free edges of the covers and leaves of the books. Such a wrapper forms the subject matter of U. S. Letters Patent No. 1,670,371, dated May 22, 1928, to which reference is here made for a description thereof in detail.

In the preferable construction shown, my improved wrapping machine comprises means which may be mounted in association with the wrapper separating and feeding mechanism for folding the wrappers to provide portions of double thickness and for applying the wrappers to the books so that said portions of double thickness will extend around the free edges of the leaves and covers thereof.

In accordance with the present invention, the folding of the wrappers to provide portions of double thickness, comprises two creasing operations, a folding and a squeezing operation, which with the manner in which the wrappers are applied to the books or other articles, are clearly shown in Figs. 21 to 27, inclusive, of the drawings.

Describing the method of creasing, folding, squeezing and applying the wrappers to the books or other articles, with particular reference to Figs. 21 and 27 of the drawings, but without reference to mechanism for effecting the same, which will presently be described, the wrappers $d'$ are first subjected to creasing operations substantially on a line $x$, Figs. 21 to 27, to bring the end portions $d^2$ thereof successively into positions at 45 and 90 degrees to the body portions of the wrappers, as shown in Figs. 22 and 23, respectively, after which the said turned down portion $d^2$ is subjected to the action of folding and setting rollers, whereby the fold is turned inwardly against the body portion of the blank, as shown in Fig. 24.

In the preferable construction shown, the frame of my improved machine comprises upright standard or pedestals $a$, $a'$, and $a^2$ on which the top conveyor A and associated parts are mounted and other standards or pedestals $b$, $b'$ $b^2$ and $b^3$ on which the bottom conveyor and associated parts are mounted, the standards or pedestals $b$, $b'$, $b^2$ and $b^3$ being vertically adjustable, to provide for adjusting the height of said standards or pedestals in order to vary the distance between the bottom lap of the top conveyor and the top lap of the bottom conveyor, to adapt the machine for wrapping articles of different thickness.

The top conveyor A consists of slats or bars 1 secured to the links of chain belts 2 adjusted to sprocket wheels 3, 3', 3² mounted on shafts 4, 4', 4², rotatably mounted in bearings in spaced journal blocks 5, 5', secured to the tops of the standards or pedestals $a$, $a'$, $a^2$. The standards or pedestals $a$—$a^2$ and $b$—$b^3$ respectively, are arranged in series which are spaced laterally from each other, the pedestals $a$ to $a^2$, being higher than the pedestals $b$ to $b^3$, and the upper conveyor shafts 4, 4', 4², being made of such length that they will project beyond their bearings in the journal boxes 5, 5', the conveyor A being secured to the projecting ends thereof in such relation that it will overhang the bottom conveyor and will be positioned substantially vertical above the same.

Secured at spaced intervals to bars or slats 1 of the top conveyor A, at uniform distances apart are lugs 6 which project outwardly beyond the surfaces of the conveyor A defined by the outer sides of said slats or bars, adapted to engage the books or other articles to be wrapped in the operation of the machine and to carry them into and through the machine.

The supporting frame for the top conveyor also comprises parts designed for carrying the weight of the upper lap of the conveyor, and still other parts which hold the bottom lap of the conveyor in position corresponding to contemplated pressure to which the books or articles being wrapped are subjected in their passage through the machine and during the wrapping operation. As shown, this is effected by frame members 7 which are secured to and carried by rods 8 mounted in bearings formed in bearing blocks 9 secured to bars 10, which extend between and the ends of which are rigidly secured to the tops of the standards $a$, $a'$, $a^2$. Adjacent to the intermediate sprocket wheels 3', the upper bars 11 are cut away to permit engagement of the chain belts 2 with said sprocket wheel.

Secured in slots formed in the upper and lower edges, respectively, of the frame members 7 are bars 11 and 12, which form tracks or treads upon which the rollers of the chain belts 2 run in the operation of the machine, the upper bars 11 carrying the weight of the upper lap of the conveyor A and the lower bars 12 limiting lifting movement of the lower lap of the top conveyor to a position corresponding to contemplated pressure to be exerted upon the books or other articles being wrapped.

To provide for wrapping books and other articles of different widths, the sprocket wheels 3, 3', 3², which support the top conveyor A and the frame members 7, are mounted so as to be bodily adjustable transversely, within contemplated limits. To effect this, the hubs of the sprocket wheels 3, 3', 3², which support said conveyor, are provided with axial bores which are slidably fitted to their respective shafts 4, 4', 4², and all of which are splined to their respective shafts so as to rotate therewith. The sprocket wheels on different shafts are held in adjusted positions by spacing sleeves placed over the shafts 4, 4', 4², between the hubs of the sprocket wheels supported on said shafts, respectively, and by collars secured to said shafts at the outer sides of said sprocket wheels by set screws or other suitable means. With the described construction, it is obvious that the conveyor may be adjusted transversely in the manner desired.

In like manner, the rods 8, which carry the frame members 7 to which the bars 11 and 12 are secured, are slidable in their bearings and are adjustably secured therein by set screws or other suitable means.

Mounted in association with the top conveyor A is an auxiliary conveyor, designated as a whole, A', said auxiliary conveyor consisting of a chain belt 16 adjusted to sprocket wheels 17 and 18, secured to rotate with conveyor shafts 4, 4'. For purposes of convenient reference and to distinguish between the conveyor A and the auxiliary conveyor A', said conveyor A may be designated the main conveyor.

The sprocket wheels 17 and 18 are of the same diameter as the sprocket wheels 3, 3', for supporting the main top conveyor A and, in operation, are rotated at the same peripheral speed as said sprocket wheels 3, 3', whereby the linear travel of the auxiliary conveyor A' will be the same as that of the main top conveyor A.

Secured to the links of the chain belt forming said auxiliary conveyor, at spaced intervals equal to the distances between adjacent lugs 6 on the top conveyor A, are lugs 20, the conveyors A, A', being mounted in such relation that the lugs 6 and 20 on said conveyors, respectively, will align with each other transversely of the machine.

As previously stated, the bottom conveyor comprises separate front and rear sections, B, B'. The front section of said bottom conveyor comprises belts 21 and 22 adjusted to pulleys 23 and 24 secured to a shaft 25 rotatably mounted in bearings formed in the frame standard or pedestal b', and to rearwardly disposed pulleys 26 and 27 which, respectively align with the pulleys 23 and 24 and which are secured, respectively, to shafts 28 and 29 rotatably mounted in suitable bearings in the frame standard or pedestal b², the shaft 29, for reasons presently apparent, being disposed rearwardly from the shaft 28, and the relation being such that an unobstructed space will be provided through said standard or pedestal to permit the turned down ends of the wrappers d to traverse said standard or pedestal without contacting with parts thereof. To effect this, the bearings for said shafts 28 and 29 are formed in the left hand side wall of said standard or pedestal, as shown in Fig. 15, and in a frame member 30 positioned intermediate the side frame members of said standard or pedestal.

The rear section of said conveyor comprises belts 31 and 32 adjusted, respectively, to pulleys 33 and 34 which, respectively, are secured to rotate with shafts 35 and 36 rotatably mounted in bearings formed in the side frame members of the frame standard or pedestal b³, the shaft 35 in this instance, being disposed frontwards from the shaft 36. The rear ends of said belts 31 and 32 are adjusted to a drum 37 secured to a shaft 38 rotatably mounted in bearings formed in the upper ends of standards or columns 39 supported on the base of the machine.

For reasons presently described, the axis of the drum shaft 38 is positioned in a plane parallel with and below a plane which extends through the axes of the shafts 35 and 36, the distance between said planes being greater than the distance which the lugs 6 on the top conveyor A project beyond the outer surface of said conveyor defined by the outer sides of the strips or bars 1.

To adapt my machine for wrapping catalogues and other articles of different thicknesses, each of the standards or pedestals b, b', b² and b³, comprises separate base and top sections designated, respectively, 40 and 41.

In the preferable construction shown, each of the base sections consists of a hollow casting, the side walls and top of which are closed and the bottom of which is open, and each of the top sections 41 consist of side frame members 42 and 43 which are rigidly connected at their lower ends by means of a frame section 44, to the ends of which the side frame sections 42 and 43 are bolted or otherwise rigidly secured.

The lower conveyor B and operative parts of the machine directly associated therewith are mounted on the upper sections 41 of said standards or pedestals b, b', b² and b³, and said upper sections, in each case, are adjustably supported on the base section to provide for raising and lowering the top section 41 to vary the distance between the adjacent laps of the conveyors A and B, B', means being also provided for guiding said upper sections 41 and for securing them in adjusted position.

As shown, the means for supporting and guiding the top standard sections 41 on the base sections 40 consists of bars 45 secured to the outer sides of the side frame members 42 and 43 of the top standard sections, the lower end of which are slidably fitted to vertical guide grooves 46 formed in the corresponding sides of the base sections of said standards, said bars being provided adjacent to their lower ends with slots 47 adapted to receive clamping screws 48 which extend through said slots and have screw-threaded engagement with holes formed in the side walls of the base sections 40, washers 49 being preferably inserted under the heads of the screws 48 which extend outwardly beyond the sides of the slots 46 and have frictional engagement with the outer sides of the supporting bars 45, the slots 47 being sufficiently longer than the distance between the screws 48 to provide for desired vertical adjustment of the top standard sections 41. In the preferable construction shown, also, the upper ends of the bars 45 are fitted to grooves formed in the top standard sections 41 and are secured in fixed position therein by means of screws 50 which extend through holes formed in said bars and have screw-threaded engagement with holes formed in the side walls of said top standard section.

With the described construction, it is obvious that, by loosening the screws 48, the upper sections will be disconnected from the base sections 40 so that said top sections may be adjusted vertically relative to said bottom sections, while by turning said screws to clamp them upon the bars 45 the upper standard sections will be secured in fixed relation relative to the bottom sections.

In the preferable construction shown, the means for adjusting the top standard sections 41 vertically consists of screws 51, see particularly Fig. 9, the shanks of which are rotatably fitted to bearings formed in bosses 52 formed on the undersides of the transverse frame sections 44 of said upper standard sections and the lower ends of which have screw-threaded engagement with nuts 53 secured in fixed position to the top walls of the base standard sections 40. As shown, the body portions of said nuts extend through holes or openings 54 formed in the top walls of said base sections and comprise enlarged upper portions or collars 55 which are secured to the top walls of the base sections by means of screws or other suitable means. When the clamping screws 48 are loosened, said top standard sections 41 are supported by collars 56 on the screws 51, upon which the lower ends of the bearing bosses 52 on the top standard sections rest, whereby turning said screws will raise or lower said top standard sections, as said screws are turned in one direction or the other. In order to reduce friction between the opposed surfaces of the bearing bosses 52 and the collars 56, antifriction bearings, indicated at 57, are interposed between the opposed surfaces of said bosses and collars.

To provide for conveniently turning the screws 51 to effect vertical adjustment of the top standard sections 41, mechanical means are provided for turning said screws, said means consisting of worm wheels 58 secured to the upper ends of said screws so that they will rotate therewith and which are secured in engagement with said screws by means of nuts 59 having screw-threaded engagement with the upper ends of said screws which are preferably smaller in diameter than the body portions of the screws, thus providing shoulders which define the positions of the worm wheels 58 on said screws, respectively.

Rotation is adapted to be imparted to the worm wheels 58 by worms 60 secured to shafts 61 rotatably mounted in bearings formed in the side frame members 42 and 43 of the upper standard sections, each of which projects through its bearing in a side frame member of said upper standard section, as shown, the side member 42, and the outer end of which is squared to provide for conveniently engaging a wrench therewith for turning the same. The worm shafts 61 will be secured against endwise movement in their bearings in any suitable or usual manner.

The foregoing description of the means for adjusting the top standard sections 41 vertically applies to all of said standards or pedestals with the exception of the standards $b^2$, which are larger than the others and which sustains greater weight. In a general way said description applies also to the means for adjusting the top standard section 41 of said standard or pedestal $b^2$, the only differences being that there are two adjusting screws 61 arranged adjacent to opposite ends of said standard or pedestal, said screws being connected so that rotation of one thereof will be imparted to the other in the same direction, thus providing for operating both of said screws by means of a single worm gear applied to one thereof.

As shown, the connection between the adjusting screws 51 of the standard or pedestal $b^2$ consists of a chain belt 62 adjusted to sprocket wheels 63 secured to the upper ends of said screws 51.

Another difference between the adjusting means for the top section 41 of the standard or pedestal $b^2$ and the others, resides in the fact that in said standard or pedestal $b^2$ the bearings for the worm shaft are formed in the side frame member 42 and the frame member 30 mounted on the transverse member 44 of the top section intermediate the side frame members 42 and 43 thereof.

Still another slight difference between the adjusting means for the top standard section 41 of said standard $b^2$ and the others, is found in the fact that, while the single adjusting screws of the standards or pedestals $b$, $b'$, $b^3$ are positioned substantially at the centers of said standards or pedestals, respectively, the adjusting screws of the standard or pedestal $b_2$ are positioned at one side of the center, as near as may be at the center of gravity of the load sustained thereby.

Secured in edgewise position to the tops of the top sections 41 of the standards or pedestals $b'$, $b^2$ and $b^3$ are bars 64 and 65, which define a channel which extends from end to end of the machine and in which the catalogues or other articles being wrapped are confined during their passage through the machine and during the wrapping operation. As shown, the bars 64 and 65 are secured in position by means of brackets 66 and 67 secured to the standards or pedestals $b'$, $b^2$ and $b^3$, to which said side bars are secured, convenient means for securing said brackets to the pedestals consisting of screws 68 which extend through holes in the base sections of said brackets and have screw-threaded engagement with holes formed in the tops of the side frames 42 and 43 of the top sections 41, or of parts supported thereon. As shown, the brackets 67 and thus the bars 65 supported thereby, are secured in fixed position, while the brackets 66 and the bar 64 supported thereby, are adjustable towards and from the bars 65, thus adapting the machine for wrapping books of different widths. As shown, contemplated adjustment of the brackets 66 and thus of the bar 64, is provided for by forming slots 69 in the bases of said brackets 66. When tightened, the screws clamp the brackets 66 firmly in position while, by loosening said screws, said brackets will be released, and with the bar 64 may be adjusted freely towards and from the brackets 67 and bar 65.

The side bars 64 and 65 are supported substantially parallel with each other and extend at right angles to the axes of the shafts which support the top and bottom conveyors A and B, B'.

Formed in the guide bars 64 and 65, preferably just in front of the front folding bar (85) presently described in detail are slots 64', 65'. Said slots are rearwardly and downwardly inclined at an acute angle to the horizontal and extend entirely through said guide bars from top to bottom. As articles to be wrapped with wrappers superposed thereon, pass rearwardly along the channel defined by the guide bars 64 and 65, the advancing edges of the projecting ends of the wrappers $d$ will enter said slots 64', 65', said slots operating in an obvious manner, to fold the projecting ends of the wrappers downwardly between the guide bars 64 and 65 at the rear sides of said slots and the lateral edges of the articles to be wrapped. As the wrappers leave said slots and pass to the folding bars—presently described—their ends will depend at substantially right angles to the article supporting surface formed by the top laps of the bottom conveyor belt sections B, B'.

Between the standards or pedestals $b'$, $b^2$, the top laps of the conveyor belts 21 and 22 of the front section B of the lower conveyor, are supported by means of T-bars 70, the front ends of which are supported by a transverse bar 71 secured to the top surface of the standard or pedestal $b'$ and which extends through holes or openings 72 formed in the depending ribs of the T-bars 70. The rear ends of said T-bars 70 rest upon and are supported by a transverse rod 73, Fig. 1, the ends of which are secured in holes or openings formed in heads 74 on the upper ends of posts 75, the lower ends of which rest upon and are secured to the base of the machine between the standards or pedestals $b'$, $b^2$.

In like manner, the top laps of the conveyor belts 31 and 32 of the rear section B' of the lower conveyor are supported by means of bars 76, see particularly Fig. 2', which are secured to and supported by transverse rods 78 and 79, the ends of which are secured in brackets 80 secured to the undersides of plates 81 and 82, the front ends of which rest upon and are secured to the top surfaces of the side frame members of the top section 41 of the standard or pedestal $b^3$, and which extend rearwardly from said standard or pedestal and the rear ends of which are supported by posts 83, the upper ends of said posts being connected by the rods 79 and the lower ends thereof resting upon and being secured to the base plate of the machine. Between the rear ends of the bars 76 and the drum 37, the conveyor belts 31 and 32 decline rearwardly, the relation being such that when the books or other articles to be wrapped pass a vertical plane extending through the axis of the rear sprocket wheel $3^3$, they will be below and disengaged from the lugs 6 on the conveyor A.

Positioned in the space between the rear conveyor pulleys 26' and 27 of the front section B of the lower conveyor and the front pulleys 33 and 34 of the rear section B' of said conveyor are what appropriately may be designated folding bars 85 and 86, which are supported in fixed position with their top sides substantially in the plane of the top laps of the conveyor belts 21 and 22 and 31 and 32 and serve both to support the catalogues or other articles being wrapped in their passage from the front section B to the rear section B' of the lower conveyor and also to fold the end portions of the wrappers resting on the tops of catalogues or other articles passing through the machine and which depend at the front and back edges thereof, upwardly in overlapped position against the undersides of said catalogues, or other articles, in the manner hereinafter fully described.

As shown, the folding bars 85 and 86 are supported in such position that their front edges, respectively, extend at angles of substantially thirty degrees to the line of movement of the articles to be wrapped passing through the machine, the front edge of the forward bar 85 extending rearwardly across the channel defined by the side bars 64 and 65 from left to right, and the folding bar 86 extending rearwardly across said channel from right to left.

Also, the rear end of the front bar 85 is substantially parallel with the front edge of the rear bar and terminates an appreciable distance therefrom.

As shown, the front end of the front bar is secured to the top surface of the left hand side frame of the upper section 41 of the standard or pedestal $b^2$ and it is supported at its rear end, by means of a post 87, see Figs. 15 and 16, the lower end of which is secured to the bottom 44 of the top section 41 of the standard or pedestal $b^2$, to the upper end of which said folding bar is secured.

The front and rear ends of the rear folding bar 86 are secured, respectively, to the top surface of the right-hand side frame member of the upper section 41 of the standard $b^2$ and to the top surface of the plate 81 secured to the top surface of the left-hand frame member of the top section of the standard $b^3$ by screws or other suitable means.

In operation the conveyor belts 21 and 22 and 31 and 32 are maintained under desired tension by means of rollers 88 rotatably mounted at the ends of arms 89, mounted to turn on fixed studs or rods 90 so that the rollers 88 will be adjustable to vary the tension of the conveyor belts, as may be desired.

My improved wrapping machine also comprises means for applying glue to an article to be wrapped, preferably adjacent to an edge thereof corresponding to what would be its bound edge of a catalogue or other book, and also to the outer surface of the end of the wrapper which is first folded inwardly beneath the article being wrapped, the glue applied to the article operating to cause the wrapper to adhere thereto and the glue applied to the wrapper causing the overlapped ends thereof to adhere to each other when the end of the wrapper opposite to that to which the glue is applied directly is folded inwardly so as to overlap the end first folded in.

As shown, the devices for applying glue to the books or other articles to be wrapped and to the wrappers are mounted, respectively, on the top sections 41 of the frame standards $b'$, $b^2$. Also, as shown, said glue applying devices are substantially identical in construction and a single description will apply equally to both. The following description will, therefore, be in the singular.

My invention contemplates the use of any desired or approved form of apparatus for applying glue to the books or other articles to be wrapped and to the wrappers. What I now consider preferable glue applying apparatus for the purpose are shown in the drawings, see particularly Figs. 11 to 15, inclusive, and will now be described.

Said glue applying apparatus comprises a glue pot 91, the bottom, sides and ends of which are closed and the top of which is closed, in part, adjacent to its side wall by plates 92, which are right and left hand duplicates of each other and are proportioned to define a parallel sided opening 93 which extends from end to end of the glue pot and is positioned at the longitudinal center thereof. The adjacent edges of said top sections are downwardly and outwardly beveled, as shown at 94, so that the space 93 between the top sections of said glue pot will form, in effect, a dove-tail groove. Fitted to slide in said opening is a plate 95, the edges of which are beveled correspondingly but oppositely to the edges of said opening. The plate 95 is supported so as to be adjustable endwise and formed in the end thereof adjacent to the glue wheel 96 is an opening 97, the inner end of said opening being inclined or beveled, as shown at 98, Fig. 14' providing a sharp scraping edge at the lower side of said plate adapted to regulate the thickness of the glue coating on said glue wheel as it emerges from the glue pot in operation, as presently described.

The end of the plate 95 adjacent to the glue wheel 96 is supported by lugs 99 on the top sections 92 of the glue pot and means are provided for adjusting said plate 95 endwise to vary the distance between the end of the opening 97 and the surface of the glue wheel 96 and thus the thickness of the coating of glue on the glue wheel as it emerges from the glue pot. Simple means for this purpose consists of a member 100, formed on which is a screw 101, which has threaded engagement with a hole formed in what may be designated the rear wall of the glue pot. Formed in said member is a groove to which is loosely fitted the forked lower end of a depending flange 104 formed on the adjacent end of the plate 95, the forked ends of said flange embracing opposite sides of the reduced portion of the member 100 formed by the groove therein. Said member 100 also preferably comprises a handle portion 105 at its outer end.

The glue pot 91 is mounted in the following manner: Rotatably mounted in bearings formed in the ends of studs 106, secured in the top sections 41 of the frame standards $b'$, $b^2$, and in a bearing formed directly in each of said top standard sections are shafts 108, 109 secured to which, respectively, one at each side of the glue pot are pairs of arms 110, slidably mounted in bearings formed in the upper ends of which are rods 111, the ends of which project through and beyond their bearings in said arms and have nuts threaded to their outer ends.

The glue pot 91 rests upon and is supported by the rods 111, being provided with saddle bearings 112 adapted to receive said rods. The arms 110 are so positioned on the rods 111 that their adjacent faces will be closely adjacent to the outer faces of the saddle bearings 112 on the glue pot, the relation being such that by tightening the nuts on said rods, the ends of the arms 110, may be clamped firmly against the faces of the saddle bearings 112, thus rigidly connecting the glue pot to the outer ends of said arms and securing the glue pot in adjusted position corresponding to the angular adjustment of the shafts 108, 109. To insure that the glue pot 91 will be horizontal in all adjusted positions, the arms 110, are all of equal length and the distance between the saddle bearings 112 on the glue pot which receive the rods 111, respectively, is equal to the distance between the shafts 108, 109.

When the nuts on the rods 111 are loosened the shafts 108, 109, are adapted to be turned pivotally to raise or lower the glue pot 91 by means of a handle 113 secured to said shaft 108.

A glue wheel 96 is mounted above the glue pot 91 in such position that its rear side will run in the opening 97 in the end of the scraper plate 95 with its lower side dipping into the glue contained in the glue pot.

As shown, said glue wheel is secured to a shaft 115 rotatably mounted in bearings formed at the ends of arms 116 supported on a shaft 117 rotatably mounted in bearings in the machine frame. For reasons presently explained, means are provided for turning the shaft 117 to raise or lower the glue wheel 114, as desired. As shown, said means are as follows:—Secured to the shaft 117 adjacent to its bearing in a frame member is an arm 118 which is adapted to be secured in different adjusted positions by means of a clamping screw 119 which extends through a vertically disposed slot 120 formed in the arm 118 and which has screw threaded engagement with a hole formed in a rigid part of the machine frame. Thus by loosening the clamping screw 119, the arm 118 and thus the shaft 117 and arms 116 will be free to turn and may be secured in any angular adjustment, corresponding to desired position of the glue wheel by again tightening the clamping screw 119. As shown, the arm 118 is adapted to be turned pivotally with the shaft 117 by means of a stud 121 which is rotatably mounted in a bearing in a rigid part of the machine frame.

Formed on said stud 121 is an eccentric collar 122 which is adapted to engage a horizontally disposed slot 123 formed in the lever arm 118. With the described construction it is obvious that rotation of the stud 121 will impart angular movement to the arm 118 and shaft 117 to raise or lower the glue wheel 114, as the stud 121 is turned in one direction or the other.

To facilitate turning the stud 121, a head adapted for engagement by a wrench, is formed on its outer end.

Mounted in association with the glue wheel 96 are daubers 125 which are secured to a shaft 126 which is rotatably mounted in bearings in the machine frame and which is adapted to be adjusted angularly in substantially the same manner as the shaft 117 by means of an arm 129 secured thereto, which is provided with vertically and horizontally disposed slots adapted, respectively, to receive a clamping screw and an eccentric adjusting stud, substantially as in the case of the arm 118.

The daubers 125 comprise portions at their outer ends, the surfaces of which are circular and concentric with the axis of rotation of the shaft 126. In operation, the shafts 117 and 128 are secured in such angular adjustments relative to each other and also relative to the glue pot 91, and the lower conveyor sections B, B', that when rotation is imparted to said glue wheel and daubers, the cylindrical surfaces on said daubers will extend into any desired proximity to the surface of the glue wheel and will also contact with the underside of a book or other article or to a wrapper applied thereto, as said book or article is fed through the machine. Obviously, it will be necessary to synchronize the movement of the daubers with the movement through the machine of the books or other articles being wrapped.

Also by adjusting the plate 95 so that the scraping edge thereof will extend into proper proximity to the surface of the glue wheel, it is obvious that the thickness of the coating of glue applied to the glue wheel may be regulated as desired.

In operation, the glue wheel shaft 115 and the dauber shaft 126 of the glue applying apparatus mounted on the standard or pedestal b' are connected in train with the conveyor shaft 25 by means of gearing which comprises a gear 131 secured to the shaft 25, gears 132 and 133 secured to the glue wheel shaft and dauber shaft, respectively, and intermediate idle gears 134.

In like manner, the glue wheel and daubers of the glue applying apparatus mounted on the standard or pedestal $b^2$ are connected by similar gearing in train with a gear 135 secured on the conveyor shaft 29.

Within the scope and contemplation of my invention, the books or other articles to be wrapped may be delivered to the wrapping machine by hand, but in practice, I prefer to deliver said books or other articles to the machine by suitable delivery mechanism designated as a whole C, which will insure an adequate supply of books or other articles to be wrapped, delivered to the machine, one at a time.

What I now consider to be preferable means for this purpose, consists of what may be called an auxiliary conveyor, the delivery end of which is mounted on the frame standard or pedestal b and which is disposed at right angles to the main conveyors A and B, B', the side frame members 42 and 43 of said top standard section being also disposed at right angles to the side frame sections of the standards or pedestal b' to b³, thus providing an unobstructed space for mounting said conveyor C.

As shown, the conveyor C comprises conveyor belts 136, adjusted to pulleys 137 secured to a shaft 138 rotatably mounted in bearings formed in the side frame members 42 and 43 of the top section 41 of the standard b, the opposite ends of said belts being adjusted to corresponding pulleys rotatably mounted in a suitable support, neither said support nor pulleys being shown.

The books or other articles to be wrapped are placed upon the conveyor belts 136 by hand and are confined thereon by guide plates 139 and 140 supported on the top frame members 42 and 43 at opposite sides of said conveyor belts, and the position of the front book for engagement by the conveyor A, being defined by stop plates 141 supported by the guide plates 139 and 140. The guide plates 139 and 140 are rigidly connected by tie rods 142, which also form supports for bars 143 along which the conveyor belts 136 travel and which sustain practically the entire weight of the books or other articles delivered thereon.

In operation, rotation is imparted to the shaft 138 and pulleys 137 by means of a chain belt 144 adjusted to sprocket wheels 145 and 146 secured, respectively, to the shaft 138 and to a shaft 147 rotatably mounted in bearings on the base portion 44 of the top section 41 of the pedestal b which is driven from the main driving shaft of the wrapping machine in the manner presently described.

The auxiliary conveyor C is mounted in such position that the surface defined by the top sides of the conveyor belts 136 will be located such a distance below the main conveyor A of the machine that the ends of the lugs 6 on said conveyor will clear a book or other article of maximum thickness—for wrapping which the machine is designed—resting upon said conveyor belts, and said conveyor comprises means for lifting the front book or other article supported on said conveyor belts 136 and which is in contact with the stop 141, so that it will be in the path of movement of the lugs 6 on the main conveyor A, with its bottom side substantially level with the top side of the front section B of the bottom conveyor.

As shown, said elevating means C comprises a cross-head designated as a whole c, comprising a table or platen 148 and a supporting base 149, said cross-head being provided with spaces 150, which extend lengthwise from end to end thereof and are positioned and proportioned to receive the top laps of the conveyor belts 136 and the bars 143 which support the same, and said spaces being made of sufficient depth to permit contemplated vertical movement of said cross-head in operation. As shown, the spaces 150 terminate above the bottom of the base 149 of the cross-head, the lower portion of said base thus forming a connection between the sections of the table 148 formed by said slots. The base section 149 of the cross-head is reinforced and strengthened by a rib 151.

The dimension of the table 148 lengthwise of the conveyor belts 136 is slightly less than the corresponding dimension of the smallest book or article which the wrapping machine is designed to wrap, as said article is delivered upon the conveyor C.

The elevator cross-head c is mounted so as to be vertically movable between the side frames 42 and 43 of the pedestal b and is guided in its vertical movement by means of engaging tongues and grooves 152 and 153 formed, respectively, on the frame members 42 and 43 and in the lateral faces of the cross-head, which comprises downward extensions 154 positioned substantially at the longitudinal centers of the cross-head.

Vertical reciprocating movement is adapted to be imparted to the cross-head c by means as follows—Rotatably mounted in bearings in the side frame members 42 and 43 is a shaft 155 secured to which is an arm 156, the outer end of which is pivotally connected to a lug or projection 157 on the cross-head by links 158. Rocking movement is adapted to be imparted to the shaft 155 by means of a cam 159 secured to the shaft 147, co-operating with which is a lever arm 160 secured to the shaft 155, mounted at the outer end of which is a roller stud 161 which runs in contact with the cam 159. The throw of the cam 159 and co-operating parts is proportioned so that when the cross-head c is in its lowermost position, the top surface of said table will be flush with or slightly below the top sides of the top laps of the conveyor belts 136, and such also that when said table is in fully raised position, a book or other article to be wrapped supported thereon will be in the path of movement of the lugs 6 on the top conveyor A of the wrapping machine. As shown, the lever arm 160 is secured to the shaft 155 by frictional engagement only, thus providing for conveniently varying the angular position of said lever arm on said shaft to bring the top surface of the table proper 148 in proper relation to the books or other articles to be wrapped supported on the conveyor belts 136.

To insure that the books or articles to be wrapped, when being conveyed by the conveyor C, will be delivered onto the table 148 one at a time, the sections of said table are provided at their ends adjacent the advancing books, with depending flanges or aprons 162 which form stops adapted to prevent movement of books resting on the conveyor belts 136 with the front book in contact with said flanges or aprons, until the top surface of said table is substantially flush with the top sides of said conveyor belts.

The lugs 6 on the top conveyor A of the wrapping machine are spaced substantially equal distances apart, the distance between adjacent lugs being appreciably greater than the dimension lengthwise of said conveyor of the largest books or other articles which the machine is designed to wrap, and the rate of movement of said conveyor is such that it will travel a distance equal to the distance between adjacent lugs 6 during the time that the cross-head c is executing a complete cycle, as from fully depressed to fully raised positions and return to fully depressed position.

Also, the raising and lowering movement of the cross head c is so timed relative to the movement of the lugs 6 that said cross head will be in fully raised position, with a book or other article supported thereon in contact with the stop plate 141—in which position said book or other article will be in the path of movement of the lugs 6 on the conveyor belt A—just before a lug 6 is advanced into position to contact with the front end of the book or other article supported on said crosshead.

When a book or other article is moved off from the cross head c by a lug 6 on the conveyor A in the operation of the machine, it is guided from said cross head onto the front conveyor section B of the lower conveyor by means of bars 163, the front ends of which are supported by the side frame 42 of the top section 41 of the frame standard or pedestal b and the rear ends of which are supported by the transverse bar 71 secured to the top of the standard or pedestal b'. As shown, said bars are rigidly connected by transverse tie rods 164 which connect said guide bars 163 so as to form a rigid, unitary structure which will maintain its position without other securing means and which will permit the top sections 41 of the standards or pedestals b, b', to be adjusted vertically, either up or down, without disturbing the adjustment of said guide bars relative to its supports on said pedestals. The front upper corners of the guide bars 163 are rounded, as shown at 165, so as to prevent the formation of a shoulder at the front ends of said bars on which the books or other articles to be wrapped might catch as they are moved off from the crosshead c onto the guides 163 by the lugs 6.

An important feature of my improved wrapping machine is that, in operation, the wrappers d' are delivered to the machine— preferably by means of an automatic feeder— between the top sides of the books or other articles to be wrapped,—supported on the conveyor cross-head c—and the lower lap of the top conveyor A, which, due to its weight and also to the fact that it is positively supported against raising movement by the fixed bars 12, provides means for subjecting the books or other articles to desired pressure during operation, by properly adjusting the top sections 41 of the pedestals $b$ to $b^3$, without the use of separate pressure means, thereby greatly simplifying the construction of the machine.

As previously stated, the wrappers d' are preferably delivered to the wrapping machine by an automatic sheet feeding machine, and in the drawings I have indicated a part of a sheet feeding machine which is designated as a whole D. Considered specifically, said sheet feeding machine forms no part of the present invention and I contemplate the use of any desired or approved feeder of which there are several on the market which can readily be adapted for the purpose.

In practice, I prefer to use the blank separating and feeding machine which forms the subject matter of U. S. Letters Patent heretofore issued to me for a machine for separating and feeding blanks, No. 1,520,022, dated Dec. 23, 1924, to which reference is here made for a description thereof in detail.

From the sheet feeder D, the separated wrappers are delivered to the wrapping machine by means of a suitable conveyor designated as a whole E, said conveying means also comprising means for folding back the ends of the wrappers which are to be adjusted around the free edges of the leaves and covers of books, to provide a double thickness of wrapping material at this point—in the manner heretofore described in detail.

Said feeding and folding means will now be described particular reference being had to Figs. 3 to 9 of the drawings.

The operative parts of said sheet conveyor and folder are mounted upon a suitable frame consisting of side frame members 166 and 167, which are rigidly connected by transverse tie rods 168. Opposite ends of said side frame members are supported on columns or standards 169, arranged in pairs transversely of the machine and which are connected by tie rods 171. At its end adjacent the pedestal b, said side frame members 166, 167, are provided with lugs e adapted to be secured to rigid parts of said pedestals by screws, bolts or other suitable means.

For reasons presently explained, the side frames 166, 167 are also connected by transverse bars 172 secured to the lower edges thereof by means of screws or other suitable means. As shown, said bars 172 are angle bars.

For reasons presently explained, also, the frame of the machine also comprises an intermediate frame member 173 secured in edgewise position to the bars 172.

From the feeder D, the wrappers $d'$ are delivered to feeding rolls mounted on the frame of the conveyor E, said rolls comprising rolls 174, $174'$, $174^2$, $174^5$, $174^4$, and $174^3$, secured to shafts 175, $175'$, $175^2$, $175^3$, $174^4$ and $175^5$. Said conveyor rolls also comprise idle pressure rolls 176, $176'$, $176^2$, $176^3$, $176^4$ and $176^5$ rotatably mounted in association with the driven rolls 174 to $174^5$, rotatably mounted at the ends of arms 177 mounted to turn on rods 178 secured in bearings in the machine frame, said pressure rolls being maintained yieldingly in contact with the driven feeding rolls 174 to $174^5$, with which they are associated, respectively, by means of springs applied to the arms 177 on which said pressure roll are mounted.

As shown, the pressure rolls 176 to $176^3$ which co-operate with the driven rolls 174 to $174^3$, are mounted below said driven rolls, said rolls 176 to $176^2$ being maintained yieldingly in contact with their respective driven rolls by coiled springs 179 inserted over guide rods 180 secured in the outer ends of the arms 177, and which extend downwardly therefrom, and the outer ends of which slidably engage bearings formed in blocks 181, which rest upon the transverse members 172, the relation being such that when the springs 179 are in operative position they will be under sufficient compression to hold the pressure rolls 176 to $176^2$ yielding in contact with said driven rolls 174 to $174^2$ with desired force.

For reasons presently explained, the pressure rolls $176^4$ and $176^5$ are mounted above their respective driven feed rolls $174^4$ and $174^5$, and said pressure rolls and also the pressure roll 176 are maintained yieldingly in contact with their respective feeding rolls by means of coiled torsion springs on the rods 178 upon which the arms 177 to which said pressure rolls $176^3$ to $176^5$ are mounted, respectively, opposite ends of said torsion springs being secured to said rods and to the hubs of the pivoted arms 177 to which they are applied, respectively.

For reasons presently explained, the rods 178 to which the arms 177, which carry the pressure rolls associated with the feeding rolls $174'$, $174^2$, $174^3$ and $174^5$ do not extend entirely across the frame of the machine, the rods 178 to which the rods 177 which carry the pressure rolls $176'$ to $176^3$, being secured in bearings formed in the side frame member 167 and in the intermediate frame member 173 and terminating a considerable distance short of the side frame member 166, leaving an unobstructed space between the ends of said rods and said frame member 166. Also, the rods 178 to which the arm 177 which carries the pressure rolls $176^5$ are pivoted, form studs, ends of which are secured in the side frame members 166 and 167, the adjacent ends thereof being separated by a space of sufficient width to permit the passage between the ends thereof of the top conveyor A of the wrapping machine proper in its different contemplated adjusted positions.

Associated with the feeding rolls are creasing, folding and setting rolls comprising rolls 182, 183 and 184 with associated pressure rolls, adapted to act upon the wrappers $d$ which traverse said conveyor E to fold the ends $d'$ of the wrappers downwardly and inwardly upon itself, as shown diagrammatically in Figs. 21 to 27 of the drawings.

The creasing roll 182 is secured to the shaft $175'$ and comprises cylindrical feeding portion 185 and a conical portion 186, the sides of which are inclined at an angle of substantially 45 degrees to the axis of the shaft $175'$, co-operating with which is a pressure roller 187, comprising a cylindrical portion 188 and a conical portion 189, the sides of which are inclined to its axis at the same angle as the conical portion of the roll 182 to the axis of its shaft, but in the opposite direction. The pressure roll 187 is mounted at the end of an arm 190 pivoted to the rod 178 to which the arm 177 which carries the pressure roller $176'$ is pivoted, the relation being such that the conical surface of the roll 187 will run in contact with the conical surface of the roll 182, said roll 187 being maintained yieldingly in contact with the roll 182 by means which are substantially the same as the means for maintaining the pressure roll $176'$ yieldingly in contact with its feeding roll $174'$, and which are designated by the same reference characters in the drawings.

The cylindrical portion 185 of the roll 182 is of the same diameter as the feed rolls $174'$ secured to the shaft $175'$ and the cylindrical portion 188 of the roll 187 is rubber-tired and of the same diameter as the pressure rolls $176'$ associated with the feed roll $174'$. As the wrapper passes between the rolls 182, 187, it is obvious that said rollers will operate to crease the wrapper so that the end thereof will be bent downwardly at an angle of substantially 45 degrees.

The creasing roll 183 is secured to the shaft $175^2$ and associated therewith is a pressure roll 191, the construction and manner of mounting said rolls 183 and 191 being substantially the same as the construction and manner of mounting the rolls 182, 187, excepting that said rolls 183 and 191 are adapted to impart a 90 degree crease or fold to the wrapper.

The folding roll 184 consists of disks 192, 193, which are rigidly connected in spaced relation, say about one-eighth of an inch apart, by an integral connection 194, which is circular in cross-section in a plane at right angles to the axis of rotation of said folding roll 184.

The edges of the disks 192, 193, are preferably rounded and their remote sides are recessed as shown at 195, their adjacent faces being continuous and each thereof being provided with a bearing hub 196.

The folding roll 184 is mounted so as to be rotatable about a vertical axis with the opening between the disk portions thereof in alignment with a plane which extends tangent to the adjacent sides of the feed rollers 174 to 174'.

As shown, see particularly Figs. 4 and 8, said folding roll 184 is rotatably mounted on a bearing member 197 which is mounted on rods 198, 199 secured in the side frame members 166 and 167 of the conveyor frame, formed on which are hubs 200, 201, provided with bearings the axes of which are in the same vertical plane and extend at right angles to each other, and fitted to turn in the bearing in the hub 201 is a driven shaft 202 rotatably mounted in suitable bearings formed in the side frame members 166, 167 of the conveyor frame.

The folding roll 184 is secured to the upper end of a shaft 204 rotatably mounted in the bearing formed in the hub 200 on the bearing member 197, to which rotation is imparted in operation by means of miter gears 205 and 206 secured to the shafts 202 and 204, respectively.

In operation, the rotation of the disks 192, 193 will guide the folds of the wrappers between said disks, holding the folded end of the wrapper in close proximity to the underside of the body portion of the wrapper, so that, after leaving said folding roll 184, said fold will be presented to the action of squeeze rolls 207 which will operate to "set" the fold.

As shown, said squeeze rolls 207, include a roll 207' secured to the shaft $175^4$, which is of the same diameter as the feeding rolls secured to said shaft and which, preferably, has a considerably wider face, say one and one-quarter inches wide, and co-operating with said squeeze roll is a pressure roll 208 which is mounted to rotate at the end of an arm 209 pivotally mounted on the rod 178 to which the arms which support the pressure rolls $176^4$ are mounted, said pressure roll being maintained yieldingly in contact with the squeeze roll 207 by a torsion spring, in the same manner that the pressure rolls $176^4$ are maintained in contact with the feeding rolls with which they are associated, respectively.

As shown, the creasing rolls 182 and 183 and the squeeze or setting rolls 207 also act as feed rolls and replace feed rolls mounted on the shafts 175', $175^2$ and $175^4$, with their associated pressure rolls. My invention, however, contemplates the use of additional feed and pressure rolls, if found to be necessary or desirable.

All of the feeding rolls 174 to $174^5$ are of the same size excepting the feeding rolls secured to said shaft, which are made sufficiently large so that the shaft $174^5$ will be positioned below and out of the path of movement of the lugs 6 on the top conveyor A of the wrapping machine.

The feeding rolls 174 to $174^5$, the arms 177 which carry the pressure rolls 176 to $176^5$, the squeeze roll 207 and the arm 209 on which the pressure roll 208 associated with the squeeze roll 207 is mounted, and also the frame 197 on which the folding roll 184 is mounted, are all secured to the shafts or rods on which they are supported so as to be adjusted transversely, to adapt the conveyor E for handling and folding wrappers of different lengths, and also for forming folds $d^2$ of different lengths.

Said roll shafts 175 to $175^5$ are all connected in train by suitable gearing, see particularly Fig. 5, comprising gears 210 to $210^5$ secured to said feed roll shafts, respectively, and intermediate idle gears 211 to $211^5$ rotatably mounted on studs secured in the side frame member of the conveyor frame. Also, the driving shaft 202 for the folding roll 184 is driven by means of a gear 212 secured thereto which meshes with the idle gear $211^3$.

All parts of my improved wrapping machine, including the book conveyor C, the feeder D and the wrapper conveyor E, are driven from a common shaft F which is driven from any suitable source of power, preferably by means of an electric motor, not shown.

The driving shaft F is rotatably mounted in suitable bearings formed in pedestals 213 secured to the base of the machine and the driving connections for different parts of the machine are as follows:

The conveyor belt A is driven from an upright shaft $f$ rotatably mounted in bearing brackets 214 secured to the rear frame pedestal $a^2$, said shaft $f$ being driven by means of miter gears 215, 216 secured to the shafts F, $f$, respectively, and the rear conveyor shaft $4^2$ being driven from the shaft $f$ by means of bevel gears 217, 218 secured to said shafts $f$, $4^2$, respectively.

The auxiliary conveyor A' is driven by the sprocket wheel 18, to which the rear end of said auxiliary conveyor A' is adjusted, both said sprocket wheel 18 and the sprocket wheel 3' of the main conveyor, being secured to said shaft 4' so as to rotate therewith, as previously explained thus providing a positive rear end drive for the bottom lap of said auxiliary conveyor, and additional power for driving the main conveyor A. As previously stated, the linear travel of the main and auxiliary conveyors is the same.

The driving connection of the shaft 4' with the shaft F may be the same as the driving connection for the shaft $4^2$.

As shown, see particularly Figs. 1, 11 and 13, the front section B of the lower main conveyor is driven from the main driving shaft F by means of transverse shafts $f'$, $f^2$, rotatably mounted in bearings formed in bearing brackets 219, 220, on the frame standards or pedestals $b'$, $b^2$, respectively, the front conveyor shaft 25 being driven from the shaft $f'$ by means of a chain belt 221 adjusted to sprocket wheels on said shafts $f'$ and 25, respectively.

The rear shafts 28 and 29, by which the rear ends of the conveyor belts 21 and 22 are supported, respectively, are driven in the following manner: The shaft 28 is driven directly from the shaft $f^2$ by means of a chain belt 222 adjusted to sprocket wheels secured to said shafts respectively, and the shaft 29 is driven directly from the shaft 28 by means of gearing comprising gears 223 and 224 secured to said shafts, respectively, and an intermediate idle gear 225 which intermeshes with said gears 223 and 224.

The rear section B' of the lower conveyor is driven by suitable connection with the main driving shaft F of the machine, said connection comprising, see particularly Fig. 1, a transverse shaft $f^3$ rotatably mounted in bearings formed in pedestals 226, secured to the base of the machine, the connection between said shafts comprising beveled gears 228, 229 secured to said shafts, respectively, and a chain belt 230 adjusted to sprocket wheels secured to the shaft $f^3$ and to the rear shaft 38 of the lower conveyor section B'.

The elevator C on the standard or pedestal $b$, see particularly Fig. 10, is driven by means of a sprocket chain 231 adjusted to sprocket wheels secured to the shaft F and to the shaft 147, respectively, said shaft 147 being rotatably mounted on the top section 41 of the pedestal $b$. The driving connection between tthe shaft 147 and the operative parts of the conveyor and elevator C have been heretofore described. The wrapper feeder D, see particularly Fig. 9, is driven from the shaft F by means of a cross-shaft $f^4$ rotatably mounted in bearing pedestals 232, said shaft $f^4$ being driven by means of miter gears secured to the shafts F, $f^4$, respectively, the driving shaft of said feeder D, indicated at 233 being driven from the shaft $f^4$ by means of a chain belt 234 adjusted to sprocket wheels secured to the shafts $f^4$, 233, respectively.

The conveyor E is driven from the driving shaft 233 of the feeder D by means of a gear 235 secured to said shaft 233 and an intermediate idle gear 236 which meshes with the gear 235 and with the gear 210 secured to the feed roll shaft 175 of the conveyor E, respectively.

In practice, separate unit members of the frame of the machine, as the pedestals $a$ to $a^2$, $b$ to $b^3$, and the various bearing and supporting pedestals, will preferably be mounted on a suitable base, preferably a cast iron base G, consisting of an integral structure comprising a plate $g$ which is reinforced and strengthened by marginal flanges $g'$—adapted to rest upon the floor or other supporting surface, indicated by the line $y$—and cross ribs $g^2$.

The top sections 41 of the standards or pedestals $b$ to $b^3$, which carry the bottom supports for the articles to be wrapped, the side guides 64 and 65, and the top conveyor A, having been adjusted into proper relative positions for wrapping articles of any given size within the capacity of the machine, the operation of my improved wrapping machine is as follows: The books or articles to be wrapped $d$ are deposited upon the auxiliary conveyor C, which when the cross-head $c$ is in fully depressed position, will deliver said articles upon the table 148 thereof with their advancing edges in contact with the stop plate 141. The vertical reciprocating movement of said cross-head $c$ lifts said articles into the path of movement of the lugs 6 on the main conveyor A, movement of subsequent articles on the auxiliary conveyor C being arrested by the stops formed by the depending flanges 162 on the sections of the table or platen 148.

While the articles are being delivered upon the table or platen 148 by the auxiliary conveyor C, the wrapper feeder D extracts wrappers $d'$ from a pack contained in the pack box of said feeder one at a time, and delivers them to the conveyor E which, in turn, delivers them upon the top sides of articles $d$ to be wrapped, resting upon the table or platen 148, the relation being such that the wrappers will be delivered upon the articles to be wrapped while the cross-head $c$ is in depressed position, and such also that said cross-head will be raised to bring said articles and the wrappers superposed thereon into the path of movement of the lugs 6 on the conveyor A and the ends of the wrappers projecting at one side of the conveyor A, into the path of movement of the lugs 20 on the auxiliary conveyor A', whereby movement will be imparted to said articles and superposed wrappers off from the table or platen 148, along the bars 163 and onto the front end of the bottom support for the articles to be wrapped, to wit, the forward end of the lower conveyor section B.

Lifting movement of the cross-head will also operate to effect contact of the articles $d$ to be wrapped and the wrappers $d'$ superposed thereon with the underside of the lower lap of the conveyor A, whereby the articles to be wrapped will be subjected to pressure, due partly to the weight of the lower lap of said conveyor A and also to the adjusted positions of the top sections 41 of the pedestals $b$ to $b^3$ which carry the supporting means for the articles to be wrapped, relative to the bars 12 which limit lifting movement of the lower lap of said conveyor A.

As the wrappers $d'$ traverse the conveyor E, one end thereof will be subjected to the action of the creasing, folding and setting rolls 182, 183, 184 and 207 mounted in association with the feeding rolls 174 to $174^5$ so that, as deposited upon the articles to be wrapped resting on the table or platen 148 of the cross-head $c$, the end portions $d^2$ of the wrappers will be folded downwardly and inwardly so as to rest in contact with the undersides of the adjacent body portions of said wrappers, thus providing portions of double thickness at one end of said wrappers.

As the articles to be wrapped, together with their superposed wrappers move rearwardly through the machine, the undersides of the projecting ends of the wrappers slide upon the top edges of the guide bars 64 and 65, which define the channel in which the articles being wrapped are confined, the relation being such that when the advancing edges of the projecting ends of said wrappers reach the slots 64', 65', they enter said slots and, as said articles and wrappers continue to advance, the projecting ends of the wrappers will be folded downwardly along the edges of the articles to be wrapped, so that they will depend between the edges of said articles and the inner sides of the guide bars 64 and 65, respectively, the relation being such that the ends of said wrappers will be turned down into depending position at the same time, as near as may be, that the advancing edge of the depending folded-in end of said wrapper comes into contact with the front end of the front folding bar 85 which, as the articles to be wrapped move rearwardly along the same, will operate to fold the ends of said wrappers which are of double thickness around the edges of the articles to be wrapped corresponding to the free edges of the leaves and covers of catalogues and other similar books, and upwardly against the bottom sides of said articles, the relation being such that said folding operation will be completed at the time, as near as may be, that the opposite depending ends of the wrappers come into contact with the front end of the rear folding bar 86, the depending ends of said wrappers, in like manner, being folded upwardly against the underside of the articles to be wrapped with their free ends overlying the outer or main body portion of the previously folded-in end thereof, the ends of said wrappers being folded so that the folded-in ends thereof will rest directly in contact with the lower sides of the articles to be wrapped.

As the articles to be wrapped are conveyed rearwardly through the machine by the conveyor A, they pass in succession, the gluing apparatus mounted on the pedestal $b'$, which operates to apply dabs of glue to the undersides of the articles to be wrapped, preferably adjacent to the edges thereof corresponding to the bound edges of books when being wrapped by the machine, and the gluing apparatus mounted on the standard or pedastal $b^2$ which applies dabs of glue to the outer sides of the main body portions of the wrappers adjacent to the folds which form the portions of double thickness, after said double portions have been folded inwardly and upwardly against the undersides of the articles to be wrapped by the folding bar 85. With the described construction, it is obvious that when the ends of the wrappers are folded upwardly against the undersides of the articles to be wrapped by the second folding bar 86, they will be forced against the dabs of glue applied to the book proper and also those applied to the ends of the wrappers previously folded in by the folding bar 85, and will be held firmly in folded-in position by the pressure to which they are subjected by the conveyor A, until the glue sets, thus gluing the overlapping ends of the wrapper together and also gluing the wrapper to the book so that it cannot be slipped off and be lost and thus prevent the book or other article from reaching destination.

As the wrapped and glued articles approach the rear end of the machine they pass onto the rear end of the rear conveyor section B', which, as previously explained, diverges rearwardly from the lower lap of the top conveyor A in such relation that when the lugs 6 on said conveyor start to pass upwardly around the rear sprocket wheels $3^2$, said articles will be below the path of movement of said lugs.

From the rear end of the rear conveyor section B', the wrapped articles are delivered onto a conveyor consisting of belts adjusted to the drum 37, to which the belts of the lower conveyor section B' are adjusted, by which they are conveyed to any desired point of deposit, as to a stacker, not shown.

I claim:

1. In a wrapping machine, the combination of a support for the articles to be wrapped, a main endless conveyor mounted above said support, driving means therefor, means on said conveyor for engaging articles on said support and propelling them together with wrappers superposed thereon through the machine, and wrapper folding means adapted for folding the ends of the wrapper downwardly around the edges of and upwardly into contact with the under sides of the propelled articles, the relation being such that the propelled articles and superposed wrappers will sustain the weight of the lower lap of the conveyor and thereby be subjected to pressure during the entire folding and wrapping operation.

2. A wrapping machine as specified in claim 1, which also comprises means for limiting lifting movement of the lower lap of the conveyor, relative to the support for articles being wrapped, providing means additional to the weight of the lower lap of the conveyor for subjecting articles being wrapped to pressure.

3. A wrapping machine as specified in claim 1, in which the bottom support for the articles to be wrapped is adjustable towards and from the bottom lap of the conveyor, and which comprises means for limiting lifting movement of the said bottom lap relative to said support.

4. A wrapping machine as specified in claim 1, in which the support for the articles to be wrapped comprises actuated end portions and intermediate fixed members which form folding means.

5. A wrapping machine as specified in claim 1, in which the support for the articles to be wrapped comprises actuated end portions and intermediate fixed members which form folding means, the space directly beneath said fixed folding members being unobstructed.

6. A wrapping machine as specified in claim 1, in which the support for the articles to be wrapped comprises actuated end portions and intermediate fixed folding means, said end portions, respectively, comprising spaced rotatable members, belts adjusted thereto, driving means for said rotatable members, and fixed bars which support the top laps of said belts.

7. A wrapping machine as specified in claim 1, in which side guides are associated with the support for the articles to be wrapped, which define a channel in which the articles to be wrapped are confined and which closely embrace the edges of said articles, said side guides consisting of plates supported in edgewise position and being provided with slots extending downwardly and rearwardly from top to bottom of said guides adapted to receive and engage the advancing edges of wrappers superposed on the articles to be wrapped as they traverse the channel defined by said guides, forming flares adapted to fold the projecting ends of said wrappers downwardly over the transverse edges of the conveyed articles, and for holding them in such turned-down positions.

8. A wrapping machine as specified in claim 1, in which the support for the articles to be wrapped comprises fixed folding bars adapted for folding the ends of wrappers superposed on articles to be wrapped and which depend at opposite edges of said articles upwardly against the undersides of said articles, said folding bars being arranged one in front of the other and extending rearwardly diagonally cross-wise of the path traversed by the articles to be wrapped through the machine, with their front ends outside of the path traversed by said articles, the rear end of the front bar terminating inside of the path traversed by said articles and short of the rear folding bar.

9. In a wrapping machine, the combination of a support for articles to be wrapped, a main endless conveyor mounted above said support, driving means therefor, means on said conveyor for engaging articles on said support and propelling them through the machine, the support for said articles comprising an actuated rear end portion which diverges from said conveyor, the relation being such that at the rear end of said conveyor articles conveyed thereby will be disengaged from the article engaging means thereon.

10. A wrapping machine as specified in claim 2, in which the actuated rear end portion of the support for the articles to be wrapped comprises spaced rotatable members, and belts adjusted thereto, said rotatable members being mounted in such relation to the rear end of the conveyor mounted above the same that the rear ends of said support and conveyor will diverge rearwardly from each other sufficiently to disengage conveyed articles from said conveyor.

11. A wrapping machine as specified in claim 1, which also comprises an auxiliary conveyor mounted in association with the main conveyor, said auxiliary conveyor comprising means for engaging the projecting ends of wrappers superposed on the articles to be wrapped, and driving means for said auxiliary conveyor, operation of said auxiliary conveyor being synchronized with operation of the main conveyor.

12. A wrapping machine as specified in claim 1, which also comprises means for limiting lifting movement of the lower lap of the main conveyor, comprising bars supported in fixed position on the machine frame at the side of the lower lap of the main conveyor remote from the support for the articles to be wrapped, with which said lower lap of said main conveyor is adapted to contact when lifting movement is imparted thereto, the relation being such that the position of the bottom lap of the main conveyor defined by the fixed bars applied thereto to prevent lifting movement thereof, will impose pressure on articles to be wrapped traversing the machine, additional to the weight of the bottom lap of said main conveyor.

13. A wrapping machine as specified in claim 1, which comprises means for supporting the weight of the top lap of the main conveyor and preventing sagging thereof.

14. A wrapping machine as specified in claim 1, in which the main conveyor comprises laterally spaced chain belts and said machine also comprises means for supporting the weight of the top lap of the conveyor and for limiting lifting movement of the bottom lap thereof, comprising frame members, upper and lower bars secured thereto below and above the top and bottom laps of the conveyor, respectively, the top laps of the chain belts forming parts of said conveyor running on the upper bars, and lifting movement of the lower lap of said conveyor effecting contact of the chain belts thereof with the fixed lower bars.

15. A wrapping machine as specified in claim 1, in which the supporting means for the articles to be wrapped are mounted on standards or pedestals each consisting of a base section and a separate top section, means for adjusting said top section relative to said base section, and means for securing said top section in adjusted position.

16. A wrapping machine as specified in claim 1, in which the supporting means for the articles to be wrapped are mounted on standards or pedestals each consisting of a base section and a separate top section, means for adjusting the top section, relative to the base section, comprising a screw rotatable in bearings in one thereof, which has screw-threaded engagement with a nut secured in the other.

17. A wrapping machine as specified in claim 1, in which the supporting means for the articles to be wrapped are mounted on standards or pedestals each consisting of a base section and a separate top section, means for adjusting the top section, relative to the base section, comprising a screw rotatable in bearings in one thereof, which has screw-threaded engagement with a nut secured in the other, and means for rotating said screw comprising a worm gear secured to said screw, a worm shaft, and a worm thereon which meshes with said worm gear.

18. A wrapping machine as specified in claim 1, in which the supporting means for the articles to be wrapped are mounted on standards or pedestals each consisting of a base section and a separate top section adjustably supported thereon, and means for guiding said top section and for securing it in adjusted position comprising parallel bars secured to one thereof slidably fitted to corresponding grooves formed in the other, and clamping screws which extend through slots in said bars and have screw-threaded engagement with a section of said standard or pedestal.

19. A wrapping machine as specified in claim 1, in which the means for mounting the main endless conveyor comprises standards or pedestals spaced laterally from the supporting means for the articles to be wrapped and shafts rotatably mounted in bearings on said pedestals which overhang their bearings so as to extend over the article supporting means on the overhanging ends of which said conveyor is mounted.

20. A wrapping machine as specified in claim 1, in which the means for mounting the endless conveyor comprises standards or pedestals spaced laterally from the supporting means for the articles to be wrapped, shafts rotatably mounted in bearings on said pedestals which overhang their bearings so as to extend over the article supporting means on the overhanging ends of which said conveyor is mounted, and a main driving shaft mounted at the side of the standards or pedestals on which the main conveyor is mounted, remote from the article supporting means and from which all of the operative parts of the machine are driven, leaving the opposite side of the machine practically unobstructed and affording safe and convenient access to the machine and to the operative parts thereof from such unobstructed side thereof.

21. A wrapping machine as specified in claim 1, which also comprises means for delivering articles to be wrapped into position for engagement by the article engaging means on the main conveyor comprising an auxiliary conveyor disposed substantially at right angles to the main conveyor of the wrapping machine and at a sufficient distance below the same so that the article engaging means on said main conveyor will clear articles to be wrapped on said auxiliary conveyor, and elevating means adapted for raising articles on said auxiliary conveyor into position for engagement by the article engaging means on the main conveyor of the wrapping machine.

22. A wrapping machine as specified in claim 1, which also comprises means for delivering articles to be wrapped into position for engagement by the article engaging means on the main conveyor comprising an auxiliary conveyor disposed substantially at right angles to the main conveyor of the wrapping machine and at a sufficient distance below the same so that the article engaging means on said main conveyor will clear articles to be wrapped on said auxiliary conveyor, and elevating means adapted for raising articles on said auxiliary conveyor into position for engagement by the article engaging means on the main conveyor of the wrapping machine and a stop which limits movement of articles by said auxiliary conveyor and which effects alignment of articles in contact therewith with the article engaging means of the main conveyor of the wrapping machine.

23. A wrapping machine as specified in claim 1, which also comprises means for delivering articles to be wrapped into position for engagement by the article engaging means on the main conveyor comprising an auxiliary conveyor disposed substantially at right angles to the main conveyor of the wrapping machine and at a sufficient distance below the same so that the article engaging means on said main conveyor will clear articles to be wrapped on said auxiliary conveyor, and elevating means adapted for raising articles on said auxiliary conveyor into position for engagement by the article engaging means on the main conveyor of the wrapping machine, said auxiliary conveyor being a belt conveyor and the article elevating means associated therewith comprising a cross-head mounted so as to be vertically movable below the top lap of said belt conveyor, and means for imparting reciprocating movement to said cross-head, the top of said cross-head being flat and being provided with slots to receive the belt portions of said auxiliary conveyor and of sufficient depth to permit desired raising movement of said cross-head without interference with belt portion of said auxiliary conveyors.

24. A wrapping machine as specified in claim 1, which also comprises means for delivering articles to be wrapped into position for engagement by the article engaging means on the main conveyor comprising an auxiliary conveyor disposed substantially at right angles to the main conveyor of the wrapping machine and at a sufficient distance below the same so that the article engaging means on said main conveyor will clear articles to be wrapped on said auxiliary conveyor, and elevating means adapted for raising articles on said auxiliary conveyor into position for engagement by the article engaging means on the main conveyor of the wrapping machine, the top of said surface being flat and having a depending flange at its end towards articles advancing along said conveyor, forming a stop which will prevent movement of article in contact therewith when the cross-head is in raised position.

25. A wrapping machine as specified in claim 1, which also comprises wrapper separating and conveying means constructed and arranged for delivering wrappers on top of articles in position to be engaged by the article engaging means of the main conveyor of the wrapping machine.

26. A wrapping machine as specified in claim 1, which also comprises wrapper separating and conveying means constructed and arranged for delivering wrapper on top of articles in position to be engaged by the article engaging means of the main conveyor of the wrapping machine and means for imparting an initial fold to wrappers to provide a portion of double thickness, the relation being such said portions of double thickness will be adjusted about predetermined edges of said articles.

27. In a book wrapping machine, the combination of book and wrapper conveying means, wrapper folding means associated therewith, wrapper separating and feeding means, and means for imparting an initial fold to said wrappers to provide a portion of double thickness, the relation being such that in the operation of the machine, said portions of double thickness will be adjusted around the free edges of the covers and leaves of the books.

28. A wrapping machine as specified in claim 1, in which the support for the articles to be wrapped comprises fixed members which form folding means, the space directly beneath said fixed members being unobstructed, and said machine comprises gluing means for applying glue to the exposed side of the end of a wrapper first to be folded upwardly against the underside of the article on which it is superposed as said article and superposed wrapper traverse said fixed members.

29. A wrapping machine as specified in claim 1, in which the support for the articles to be wrapped comprises fixed members which form folding means, the space directly beneath said fixed members being unobstructed, and said machine comprises gluing means for applying glue to the exposed under side of the article to be wrapped and to the exposed side of the end of the wrapper first folded upwardly against the underside of the article on which it is superposed as said article and superposed wrapper traverse said fixed members.

In witness that I claim the foregoing as my invention, I affix my signature this 8th day of February, A. D. 1928.

SIGWALD C. GRUNLEE.